United States Patent [19]
Abadeer et al.

[11] Patent Number: 6,140,885
[45] Date of Patent: Oct. 31, 2000

[54] ON-CHIP AUTOMATIC SYSTEM FOR IMPEDANCE MATCHING IN VERY HIGH SPEED INPUT-OUTPUT CHIP INTERFACING

[75] Inventors: Wagdi W. Abadeer, Jericho; John Connor, Burlington; Patrick R. Hansen, Essex Junction, all of Vt.

[73] Assignee: International Business Machines Corporation, Armonk, N.Y.

[21] Appl. No.: 09/255,997

[22] Filed: Feb. 23, 1999

[51] Int. Cl.[7] .................................. H03H 7/38; H03H 7/40
[52] U.S. Cl. ............................ 333/17.3; 327/333; 333/33
[58] Field of Search ............................ 333/17.3, 32, 33; 326/30, 62; 327/333

[56] References Cited

U.S. PATENT DOCUMENTS 5,534,812   7/1996   Cao et al. .............................. 326/30 X

OTHER PUBLICATIONS

S.L. Miller et al., "Failure Modes in Surface Micromachined MicroElectroMechanical Actuators," IEEE 98CH36173, 36th Annual International Reliability and Physics Symposium, pp. 17–25 (Reno, Nevada, 1998).

D. M. Tanner et al., The Effect of Frequency of the Lifetime of a Surface Micromachined Microengine Driving a Load, IEEE 98CH36173, 36th Annual International Reliability Physics Symposium, pp. 26–35 (Reno, Nevada, 1998).

E.J. Garcia et al., "Surface Micromachined Microengine," Sensors and Actuators A, vol. 48, pp. 203–214 (Elsevier Science S.A. 1995).

W. H. Hayt, Jr., "Transmission Lines," *Engineering Electromagnetics*, Chapter 12, pp. 427–456 (McGraw–Hill, 1981).

*Primary Examiner*—Paul Gensler
*Attorney, Agent, or Firm*—Ratner & Prestia; Tiffany L. Townsend

[57] ABSTRACT

An impedance matching system and a network for automatic impedance matching at a driver circuit output for high frequency input-output devices. The impedance matching network comprises a control circuit which varies a control voltage proportionally to the frequency of voltage transients that occur on the driver circuit output, an adjustment mechanism which provides a linear motion proportional to the control voltage, and an adjustable length transmission line whose length is adjusted in proportion to the frequency of voltage transients on the driver circuit output and whose impedance, which is purely reactive, is proportional to its length. The purpose of the adjustable length transmission line is to reduce transient voltages by providing a matching impedance for the reactive component of the impedance of the receiver network to the driver circuit. In the preferred embodiment, the impedance matching network is manufactured on the same chip as the driver circuit.

15 Claims, 19 Drawing Sheets

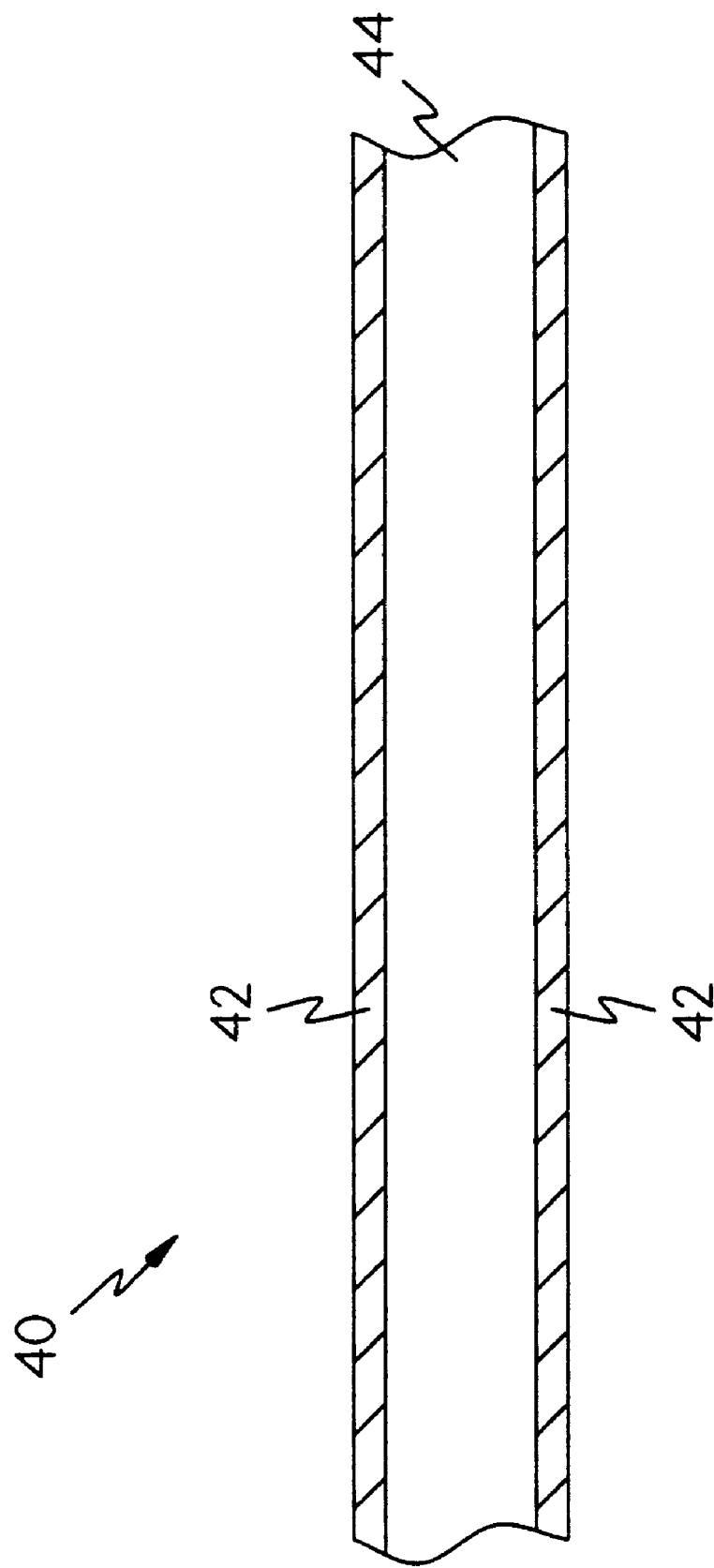

ON-CHIP AUTOMATIC SYSTEM FOR IMPEDANCE MATCHING IN VERY HIGH SPEED INPUT-OUTPUT CHIP INTERFACING

TECHNICAL FIELD

The present invention relates generally to fabrication of semiconductor devices and, more particularly, to a system and structure for impedance matching in very high speed input-output (I/O) chip interfacing.

BACKGROUND OF THE INVENTION

Among the most important aspects in integrated chip system design are the interface considerations for very short channel Complementary Metal-Oxide-Semiconductor (CMOS) or Bi-polar CMOS (BICMOS) devices, or other very large scale integrated circuit (VLSI) or (ULSI) chips, in high speed applications. Beginning with the driving circuit, an on-chip voltage swing of ground to Vdd (internal power supply) must be communicated off-chip to external devices. The path from the driver output to the output pad involves capacitive coupling effects to other on-chip signals. Moreover, the chip packaging system adds inductances to the circuit. The external signals must then traverse some interconnect (or transmission line), such as card traces or multi-chip module (MCM) connections. The signals are subject to additional deformations at this point due to transmission line effects.

The use of external decoupling capacitors to stabilize the card power supply provided to the chip is known in the art. For low-impedance card power plane connections, these external capacitors do not reduce the on-chip simultaneous switching noise of the driver circuit. Such on-chip simultaneous switching noise can lead to an impedance mis-match between the driving circuit and the card interconnect or transmission line.

Transmission line effects become significant when the round trip propagation delay from the sending chip to the receiving chip is greater than the rise time of the transmitted signal. This condition is almost always met for modern CMOS-based digital systems. When this is the case, reflections occur on the signal line due to impedance mismatches between the source, the transmission line, and the load. These reflections are superimposed on the transmitted signal, causing significant overshoot, undershoot, and system-wide noise. This can cause both performance problems and reliability problems.

The performance problem is a reduction in the valid-data window of transmitted pulses with respect to the system clock. The reliability problem involves devices with ultra-thin gate dielectric layers, less than 5 nm thickness, for which overshoots and undershoots can have a very significant effect in reducing the useful life of the thin gate dielectric. This problem can lead to catastrophic breakdown, causing a serious system reliability problem. The voltage overshoots and undershoots can also cause latch-up in CMOS devices leading to serious reliability problems. For very high speed CMOS applications where the data rates are in the range of 1 GHz to 10 GHz and above, these performance and reliability problems can cause severe design limitations and prove very costly.

The deficiencies of the conventional impedance matching systems show that a need still exists for improvement. To overcome the shortcomings of the conventional systems, a new system and structure for impedance matching in very high speed I/O chip interfacing is provided. It is an object of the present invention to provide a system and device to achieve impedance matching at a driver circuit output, thereby preventing and not merely compensating for high voltage transients (overshoots) and low voltage transients (undershoots). It is another object of the present invention to provide a system and device for impedance matching which can be manufactured on the same chip as the driver circuit. It is yet another object of the present invention to provide a system and device capable of automatically adjusting to provide impedance matching at a driver circuit when operating conditions cause changes to the system. Still another object of the present invention is to provide an impedance matching system capable of performing its functions under a wide range of values for the various components comprising both the on-chip driver circuit and the off-chip interface circuitry.

SUMMARY OF THE INVENTION

To achieve these and other objects, and in view of its purposes, the present invention provides a process for fabricating an impedance matching network comprising an adjustable length transmission line, an adjustment mechanism, and a control circuit. The adjustable length transmission line has two conductive stripes connected in parallel with an I/O driver circuit at one end, electrically isolated at the opposite end, and short circuited by a movable stub intermediate of the ends. The adjustable length transmission line is located on the same chip as the I/O driver circuit.

The impedances at the driver circuit output are matched by adjusting the length of the adjustable length transmission line such that the composite reactance of the load, the transmission line between the driver circuit chip and the load, the connections, and the adjustable length transmission line equals the converse of the driver reactance. The length of the adjustable length transmission line is adjusted by an adjustment mechanism. In the preferred embodiment, the adjustment mechanism is a microengine which can be manufactured on the same chip as the driver circuit. The adjustment mechanism allows movement of the movable stub which is proportional to a control voltage provided to the adjustment mechanism by a control circuit which is also on the same chip as the driver circuit.

The control circuit generates a control voltage which varies in response to high and low transient voltages on the driver circuit output. In the preferred embodiment, the control circuit comprises a positive detect circuitry and a negative detect circuitry, each of which provides a high (up) pulse to a counter when triggered by a transient, and a down pulse generator which provides a low (down) pulse to the counter as a function of the system clock. Both the positive detect circuitry and the negative detect circuitry are self resetting.

In the preferred embodiment, the control circuit further comprises a quantity of "n" N-type field effect transistors connected in parallel between internal power and a control voltage node. The transistors have control gates connected to an n-bit counter which is incrementally increased by a positive detect circuitry when an overshoot occurs on the driver circuit output and by a negative detect circuitry when an undershoot occurs on the driver circuit output. Thus, the number of transistors drawing current and the control voltage are determined by the frequency of transients occurring on the driver circuit output.

The present invention provides considerable improvement over the prior art. Whereas the prior art has been directed toward compensating for transient voltages using isolation rings, forward biasing, excess dielectric, and decoupling capacitors on the system card, the present invention is directed to preventing voltage transients on the driver circuit output by impedance matching. Also, by automatically adjusting the length of the adjustable length transmission line based on the frequency of transients, the present invention can operate over a wide range of operating conditions and even over varying operating conditions. For instance, when operating conditions change dynamically during operation, the present invention can automatically adjust the impedance to provide matching.

It is to be understood that both the foregoing general description and the following detailed description are exemplary, but are not restrictive, of the invention.

BRIEF DESCRIPTION OF THE DRAWING

The features and advantages of a semiconductor device according to the present invention and further details of a process of fabricating such a semiconductor device in accordance with the present invention will be more clearly understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 2B highlights the transmission line shown in FIG. 2A;

DETAILED DESCRIPTION OF THE INVENTION

Figure 1:
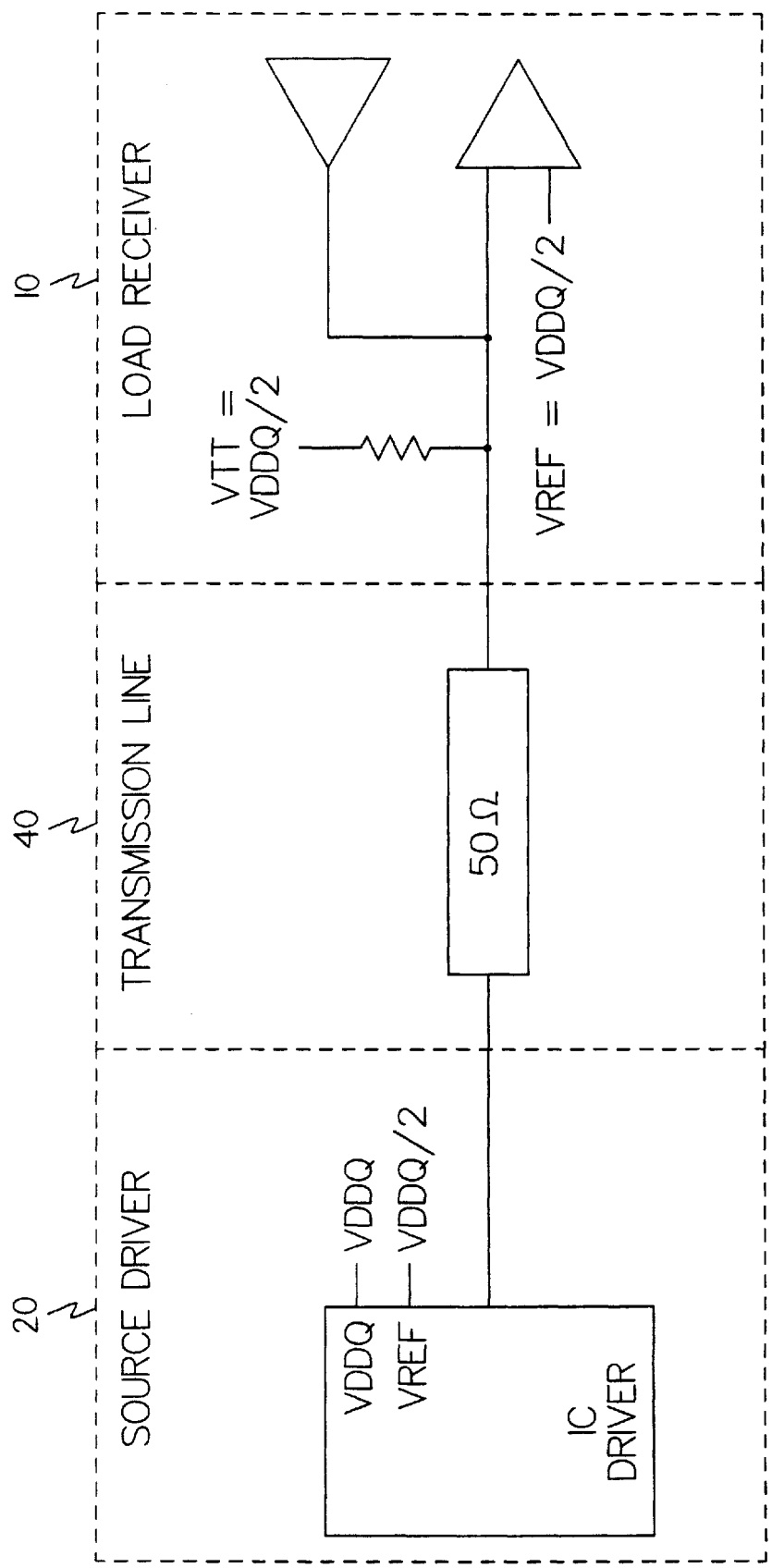
FIG. 1 illustrates a conventional circuit model for a driver circuit, an off-chip receiver circuit, and a transmission line.

The present invention will be described in detail with reference to the accompanying drawing in which like reference numerals designate similar or corresponding elements, regions, and portions. Several processes of compensating for the overshoots and undershoots caused by impedance mis-match are known in the art. Guard rings, excess dielectric, and forward biasing are some examples of the techniques used to compensate for the transient voltages caused by impedance mis-match. The present invention provides a process for matching the reactive component of the impedance of the load and the transmission line to the impedance of the driver circuit, thereby preventing overshoots and undershoots and their associated performance and reliability problems.

FIG. 1 shows a circuit model for a driver circuit (20), a receiver circuit (10) on a different chip from the driver circuit, and a transmission line (40) according to the prior art. When the net reactance at the driver circuit (20) is not zero (impedance mis-match), reflections occur on the signal line. Such reflections cause overshoots and undershoots.

Figure 2A:
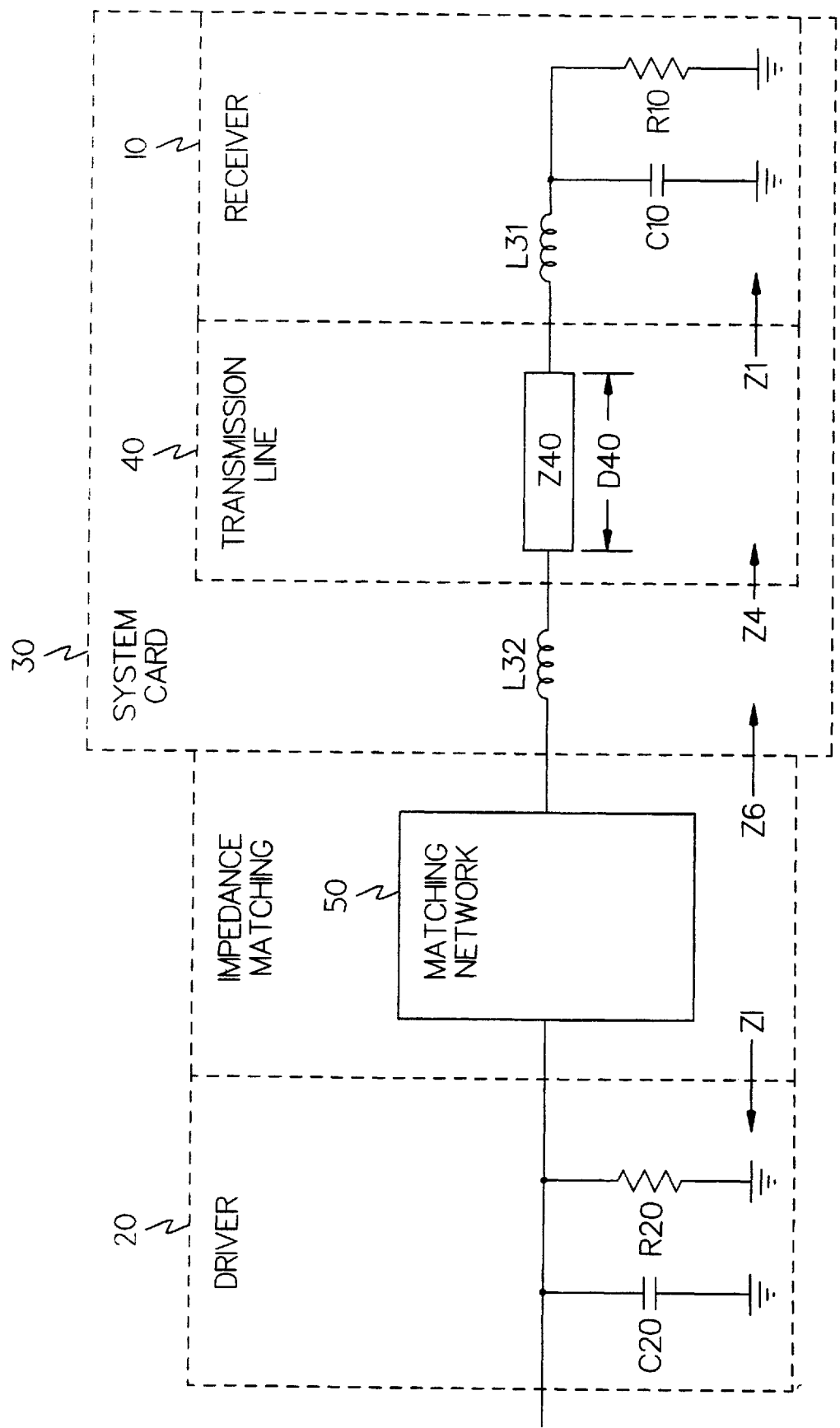
FIG. 2A illustrates a circuit model for the driver, on-chip impedance matching network of the present invention, transmission line, and off-chip receiver circuit showing the impedance matching network as a black box.

FIG. 2A shows a circuit model of the most significant resistive and reactive (e.g., inductive and capacitive) components involved in a system where an on-chip driver circuit (20) is used to supply a signal (voltage) to a receiver circuit (10) on a different chip from the driver circuit. The matching network (50) is the focus of the present invention.

The on-chip driver circuit (20) has a resistance (R20) and a capacitance (C20). The driver resistance (R20) is typically about 50 ohms. The driver capacitance (C20) is typically between about 4–5 pF and, more specifically, about 4.7 pF. As will be shown later, however, the present invention can function with values that differ from the given typical values.

The receiver circuit (10), which is off-chip, has a resistance (R10) and a capacitance (C 10). The receiver resistance (R10) can vary in value depending on the particular system; a typical value is about 50 ohms. It will be demonstrated that the present invention will work independently of the termination resistance of the receiver circuit from a receiver resistance (R10) of 50 ohms to a receiver resistance (R10) approaching the "infinite" resistance of an open circuit. The receiver capacitance (C10) is typically about 3.7 pF.

The chip packaging at the receiver provides a receiver inductance (L31). Chip packaging connections provide a driver inductance (L32). The receiver inductance (L31) and the driver inductance (L32) are each about 2 nH.

As shown in FIG. 2B, the transmission line (40) is usually composed of printed stripes (42) of conductive material on the system circuit card (30). The dielectric constant ($\epsilon 40$) of the insulator (44) between the stripes (42) is typically about 4.5. The relative permeability ($\mu 40$) of the insulator (44) is typically about 1. The characteristic impedance (Z40) of the transmission line (40) is typically about 50 ohms. FIG. 2A illustrates that the transmission line (40) has a length (D40) of about 76 mm (3 inches).

Unless otherwise specified, all calculations are performed and all graphs are made using the typical values provided above for driver resistance (R20), driver capacitance (C20), receiver resistance (R10), receiver capacitance (C10), driver inductance (L32), receiver inductance (L31), transmission line length (D40), transmission line dielectric constant ($\epsilon 40$), and transmission line characteristic impedance (Z40). As will be demonstrated later, however, the present invention can provide impedance matching over a wide range for each of these characteristics.

Figure 3A:
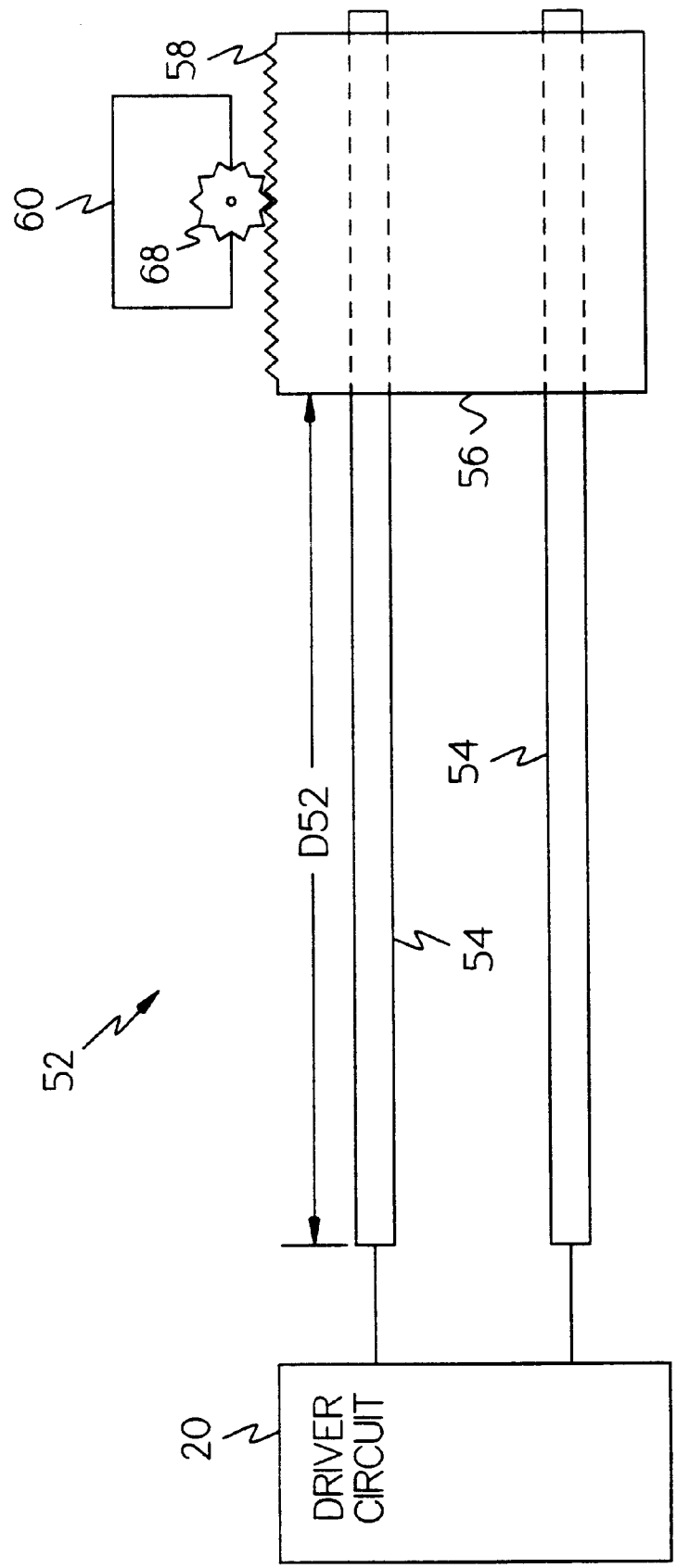
FIG. 3A illustrates the adjustable length transmission line of the matching network according to the present invention.
Figure 6A:
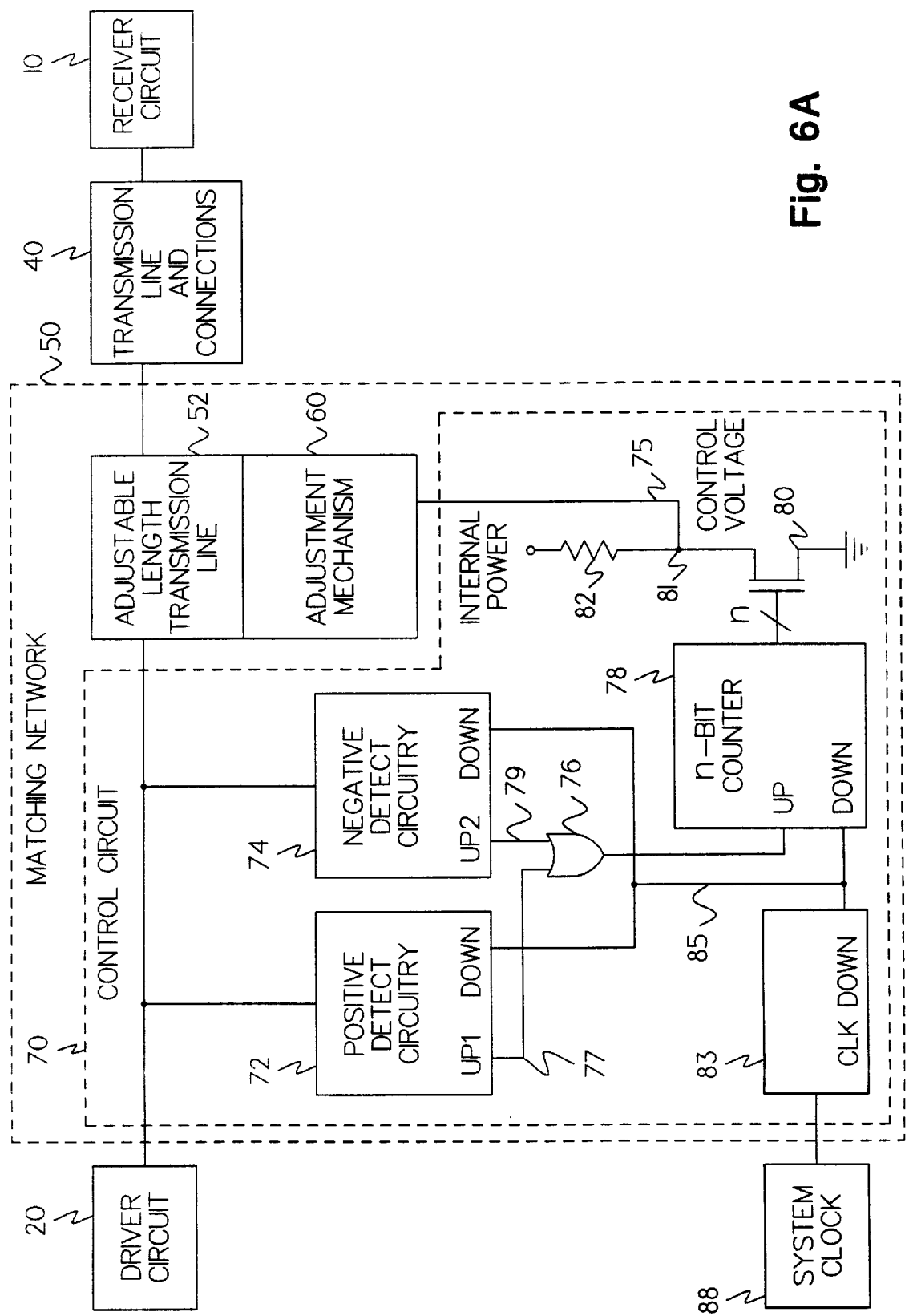
FIG. 6A shows a block diagram of the control circuit of the present invention.

The matching network (50) comprises an adjustable length transmission line (52) having a variable length (D52), an adjustment mechanism (60), and a control circuit (70). These elements are shown in FIGS. 3A and 6A. For ultra-high frequency applications (above 1 GHz), the matching network (50) is preferably located on the same chip as the driver circuit (20).

As shown in FIG. 3A, the adjustable length transmission line (52) comprises two parallel conductive lines (54) connected in parallel with an on-chip driver circuit (20) at one end, electrically isolated at the opposite end, and shorted by a movable stub (56) intermediate of the two ends of the parallel conductive lines (54). The conductive lines (54) can be composed of a variety of conductive materials, most preferably polysilicon. The width of the conductive lines (54) is preferably between about 50 $\mu$m and 100 $\mu$m, their thickness is preferably between about 0.25 $\mu$m and 1 $\mu$m, and they are preferably spaced apart a distance of between about 30 $\mu$m and 1,000 $\mu$m.

The conductive lines (54) can be formed using conventional deposition and patterning techniques. They are preferably formed as part of a microengine. The details of a suitable microengine are provided by S. Miller et al., "Failure Modes in Surface Micromachined MicroElectroMechanical Actuators," IEEE 98CH36173, 36th International Reliability and Physics Symposium Proceedings, pages 17–25 (Reno, Nev., 1998); D. Tanner et al., "The Effect of Frequency on the Lifetime of a Surface Micromachined Microengine Driving a Load," IEEE 98CH36173, 36th International Reliability and Physics Symposium Proceedings, pages 26–35 (Reno, Nev. 1998); and E. Garcia and J. Sniegowski, "Surface Micromachined Microengine," Sensors and Actuators A, Vol. 48, pages 203–14 (Elsevier Science S.A. 1995). The details of the microengines disclosed by these references are incorporated by reference.

The movable stub (56) is preferably composed of silicided polysilicon. The movable stub (56) is preferably formed using conventional micro-machining techniques as part of the microengine. The movable stub (56) has a sufficient width to simultaneously contact both of the parallel conductive lines (54) and a thickness of between about 2 $\mu$m and 5 $\mu$m. The movable stub (56) further comprises a gear tooth rack (58) which is driven by a pinion gear (68) from the adjustment mechanism (60).

The adjustment mechanism (60) receives a control voltage (75) from the control circuit (70) (see FIG. 6A) causing it to transfer a linear motion to the movable stub (56). The linear movement of the movable stub (56) adjusts the length (D52) of the adjustable length transmission line (52). The adjustment mechanism (60) is preferably formed as part of a microengine as described in the article by E. Garcia and J. Sniegowski previously mentioned.

Figure 3B:
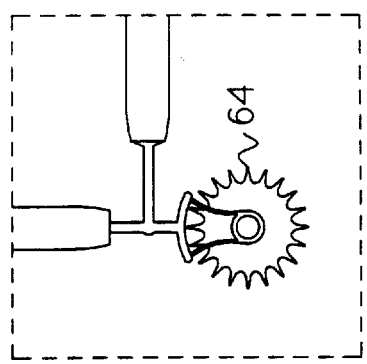
FIG. 3B illustrates the adjustment mechanism of the matching network according to the present invention, with expanded views of the comb drive (3B2) and the rotating gear (3B1)
Figure 3B:
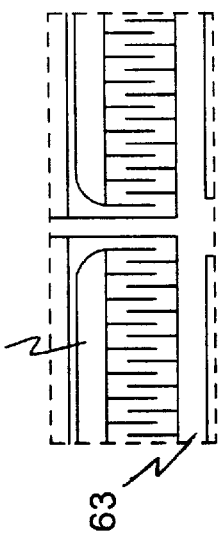
Figure 3B:
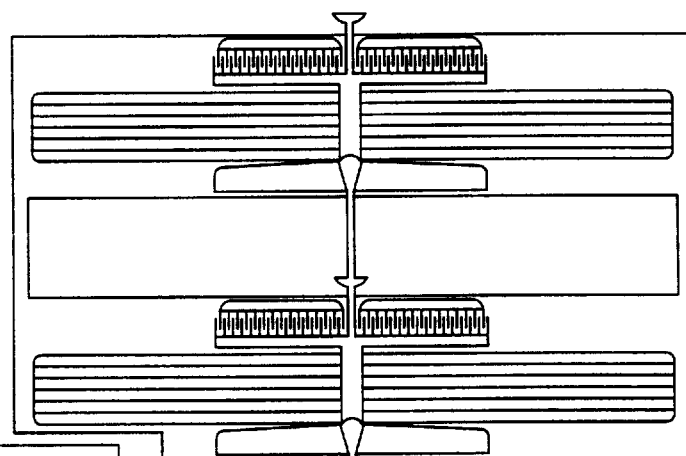
Figure 3B:
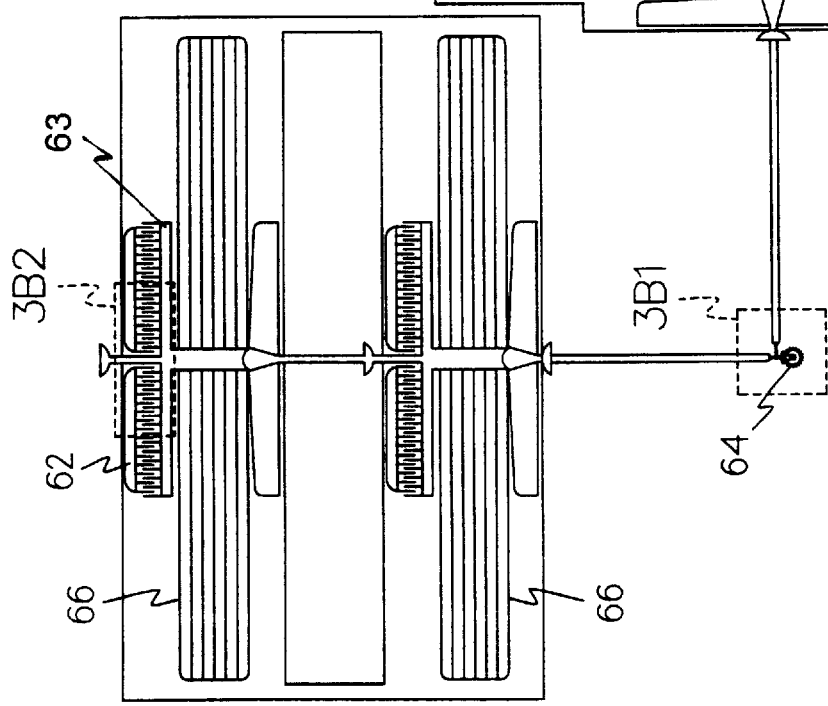

As shown in FIG. 3B, the adjustment mechanism (60) shown in FIG. 3A preferably comprises a first series of capacitor plates (62) energized by the control voltage (75), and a second series of capacitor plates (63), parallel to the first series of capacitor plates (62) and spaced alternately between them. The electrostatic force caused by the electric field resulting from energizing the capacitor first series of plates (62) results in movement of the second series of capacitor plates (63) in a first direction. The second series of capacitor plate (63), which are linked to the drive gear (64) of the microengine, cause the drive gear (64) to rotate. The drive gear (64) is connected to the pinion gear (68) through a gear train. Thus, the rotation of the drive gear (64) causes a rotation of the pinion gear (68). The rotation of the pinion gear (68) in turn causes linear movement of the gear tooth rack (58) and linear movement of the movable stub (56).

As the control voltage (75) is reduced, the capacitor plates (62) are moved in a second direction, opposite to the first direction, by restoring springs (66). This causes opposite rotation of the drive gear (64) and the pinion gear (68), causing an opposite linear adjustment of the movable stub (56). The use of a microengine to move the movable stub (56) in an impedance matching network is a part of the present invention.

Referring to FIG. 6A, the control circuit (70) detects overshoots or (positive) high voltage transients and undershoots or (negative) low voltage transients on the driver circuit output and provides a control voltage (75) to the adjustment mechanism (60) to adjust the length (D52) of the adjustable length transmission line (52). Such adjustment minimizes overshoots and undershoots. The magnitude of the control voltage (75) is proportional to the frequency of overshoots and undershoots.

Referring to FIG. 6A, the control circuit (70) comprises positive detect circuitry (72) and negative detect circuitry (74) connected to the output of the driver circuit (20). When an overshoot is detected by the positive detect circuitry (72), a high pulse is generated by the positive detect circuitry (72) at node UP1 (77). When an undershoot is detected by the negative detect circuitry (74), a high pulse is generated by the negative detect circuitry (74) at node UP2 (79).

Nodes UP1 (77) and UP2 (79) are connected to the inputs of an OR gate (76), which is in turn connected at its output to an n-bit counter (78). The n-bit counter (78) is connected to the control gates of a series of "n" N-type field effect transistors or NFETs (80) in parallel. A quantity of NFETs (80) are made active or turned on equal to the count of the n-bit counter (78) drawing a current, which is proportional to the number of NFETs (80) energized, through the NFETs (80). The NFETs (80) are connected to ground at their sources and to the node CONTROL VOLTAGE (81) at their drains. The node CONTROL VOLTAGE (81) is connected to internal power through a voltage splitting resistor (82).

The control voltage (75) at the node CONTROL VOLTAGE (81) is determined by the voltage drop across the voltage splitting resistor (82), which is proportional to the quantity of NFETs (80) which are energized. The node CONTROL VOLTAGE (81) is connected to the adjustment mechanism (60), providing the control voltage (75) to the adjustment mechanism (60).

A down signal is periodically generated by the CLK down generator (83) on the node DOWN (85) as a function of the system clock (88). The down signal causes the n-bit counter (78) to count down to prevent the impedance matching network from being overadjusted because of impedance changes due to dynamic environmental conditions such as temperature.

When a positive transient or overshoot occurs on the output of driver circuit (20), the positive detect circuitry (72) generates a high pulse at node UP1 (77).

Figure 6B:
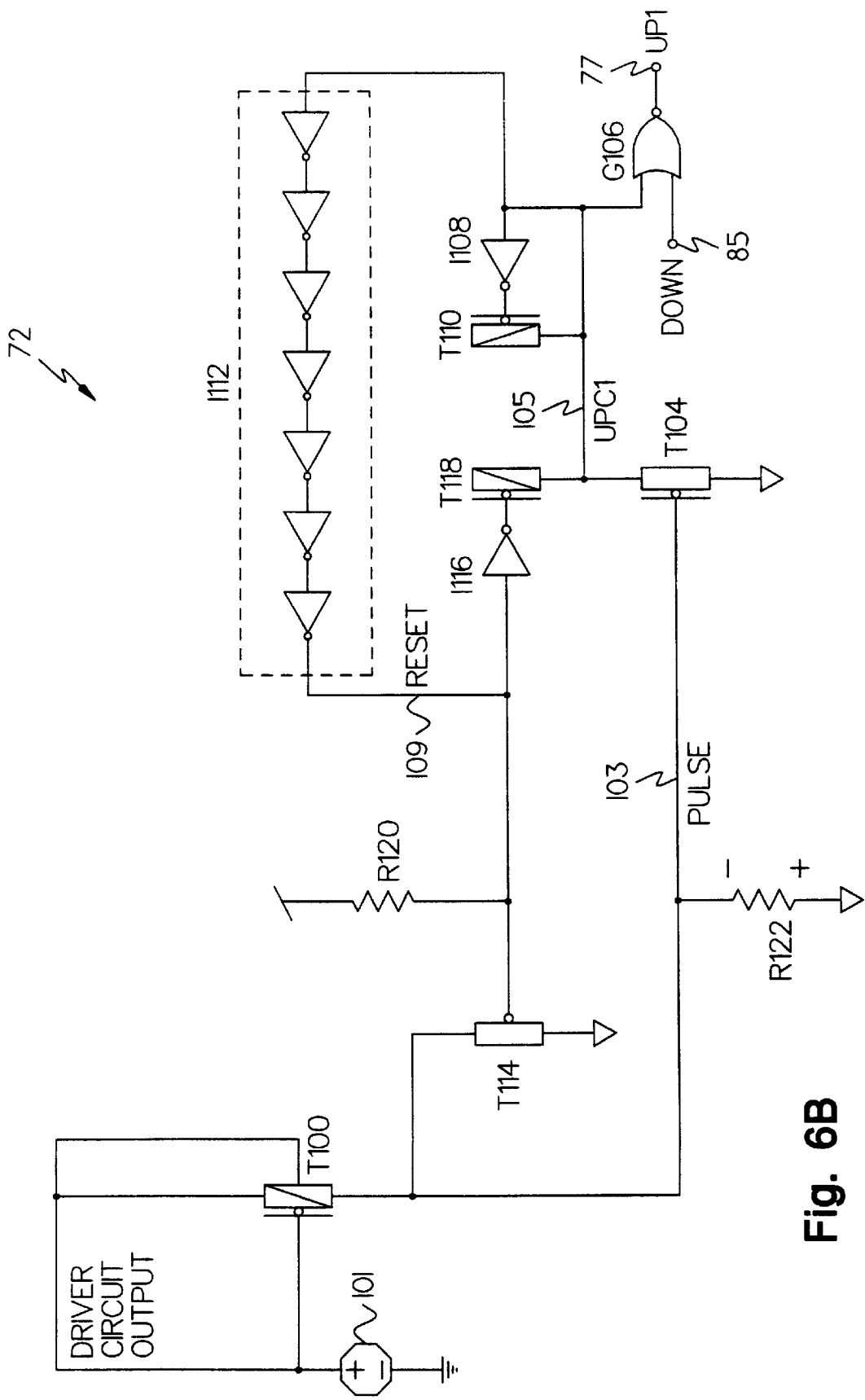
FIGS. 6B and 6C show schematics of the positive and negative detect circuitry of the present invention.

The positive detect circuitry (72) can be implemented as shown in FIG. 6B. A pulse up transistor (T100), which is an N-well PFET, is connected to the driver circuit power supply (101) at its body and to a high reference potential, typically the driver circuit power supply (101) at its control gate (VGATE). The pulse up transistor (T100) is connected to the output of driver circuit (20) at its source and to node PULSE (103) at its drain. When a positive transient occurs on the driver circuit output, the pulse up transistor (T100) switches the node PULSE (103) from low to high. An up interrogate transistor (T104), which is an NFET, is connected to the node PULSE (103) at its control gate, to ground at its source, and to node UPC1 (105) at its drain. When node PULSE (103) switches to high, the up interrogate transistor (T104) switches node UPC1 (105) from high to low.

Nodes UPC1 (105) and DOWN (85) are connected to inputs of a NOR gate (G106) which generates an up pulse on node UP1 (77) when node UPC1 (105) is low due to a transient, provided node DOWN (85) has not been switched to a high level due to the CLK down generator (83). Node UPC1 (105) is also connected to a voltage keeper comprising an inverter (I108) connected to the control gate of a PFET keeper transistor (T110). The source of the keeper transistor (T110) is connected to internal power and the drain is connected to node UPC1 (105) such that node UPC1 (105) is held high until interrogation by the up interrogate transistor (T104) can occur, thereby preventing accidental tripping by system noise.

Node UPC1 (105) is also connected to a reset loop comprising an odd number of reset delay inverters (I112) connected in series. The last reset delay inverter (I112) is connected to node RESET (109). The number of reset delay inverters (I112) is sufficient to cause a delay longer than the duration of the transient. Experimental modeling has shown that seven reset delay inverters (I112) are typically sufficient. When node UPC1 (105) switches low, the reset loop switches node RESET (109) from low to high. The node RESET (109) is connected to the control gate of a pulse reset transistor (T114), which is an NFET connected to ground at its source and connected to node PULSE (103) at its drain. When node RESET (109) switches to high, the pulse reset transistor (T114) switches node PULSE (103) back to its original state of low.

Node RESET (109) is also connected to a UPC1 reset inverter (I116), which is in turn connected to the control gate of a UPC1 reset transistor (T118). The UPC1 reset transistor (T118) is a PFET connected to internal power at its source and connected to node UPC1 (105) at its drain. When node RESET (109) switches high, the UPC1 reset transistor (T118) switches node UPC1 (105) back to its original state of high.

A first optional isolating resistive device (R120) can be connected between internal power and node RESET (109) to prevent accidental switching due to coupling to external signals or system noise. Likewise, a second optional isolating resistive device (R122) can be connected between ground and node PULSE (103). The isolating resistive devices (R120, R122) can be resistors or resistively connected FETs.

Figure 6C:
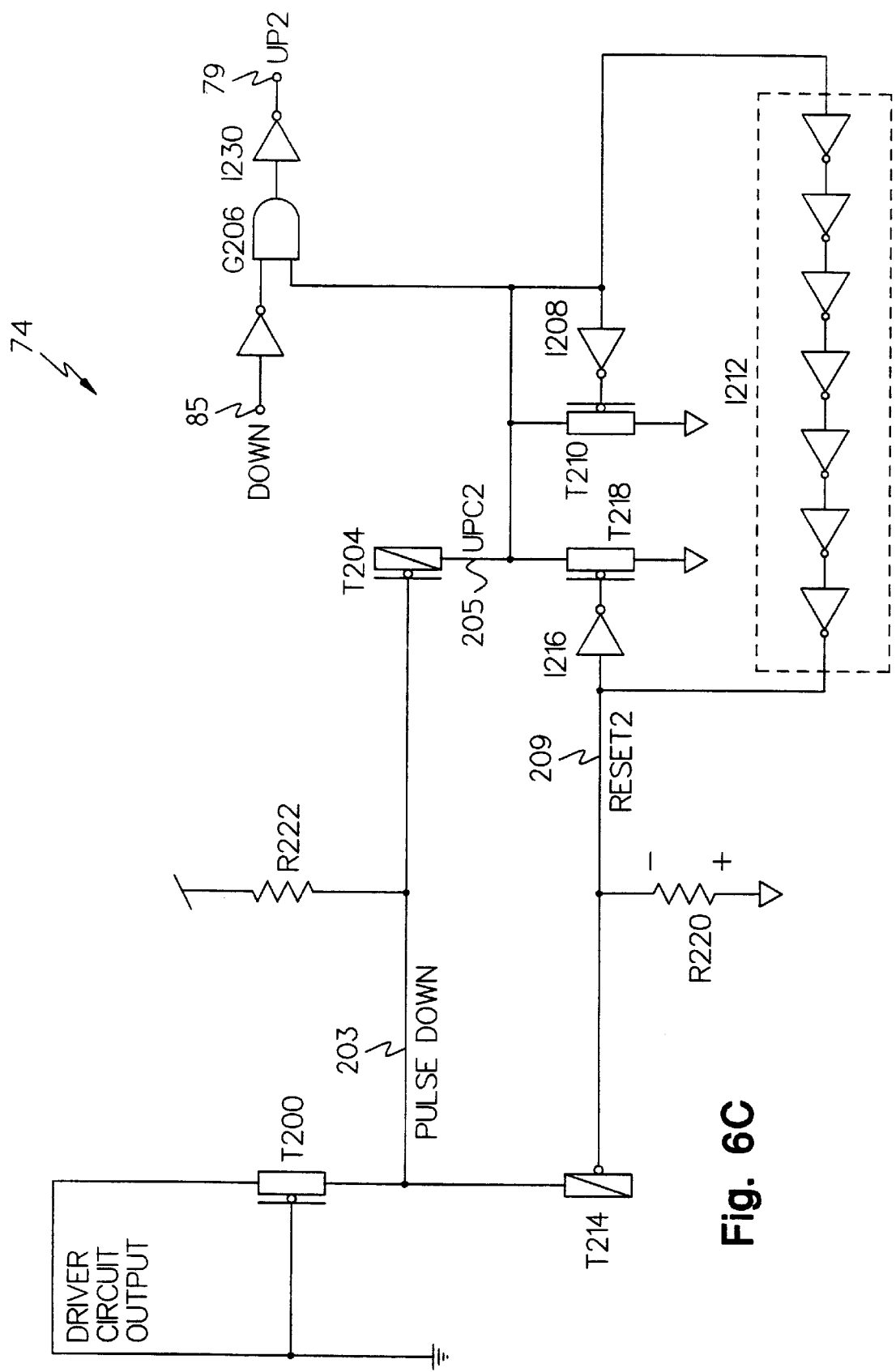

The negative detect circuitry (74) is a mirror image of the positive detect circuitry (72). When a negative transient or undershoot occurs on the driver circuit (20) output, the negative detect circuitry (74) generates a high pulse at node UP2 (79). The negative detect circuitry (74) can be implemented as shown in FIG. 6C.

A pulse down transistor (T200), which is an NFET, is connected to a low reference potential, typically ground, at its control gate (VGATE2). The pulse down transistor (T200) is connected to the output of driver circuit (20) at its source and to node PULSE DOWN (203) at its drain. When a negative transient occurs on the driver circuit output, the pulse down transistor (T200) switches the node PULSE DOWN (203) from high to low. A down interrogate transistor (T204), which is a PFET, is connected to the node PULSE DOWN (203) at its control gate, to internal power at its source, and to node UPC2 (205) at its drain. When node PULSE DOWN (203) switches to low, the down interrogate transistor (T204) switches node UPC2 (205) from low to high.

Nodes UPC2 (205) and DOWN (85) are connected to inputs of a NAND gate (G206), which is connected in series with an UP2 inverter (I230), generating an up pulse on node UP2 (79) when node UPC2 (205) is high due to a transient, provided node DOWN (85) has not been switched to a high level due to the CLK down generator (83). Node UPC2 (205) is also connected to a voltage keeper comprising an inverter (I208) connected to the control gate of an NFET keeper transistor (T210). The source of the NFET keeper transistor (T210) is connected to ground and the drain is connected to node UPC2 (205) such that node UPC2 (205) is held low until interrogation by the down interrogation transistor (T204) can occur, thereby preventing accidental tripping by system noise.

Node UPC2 (205) is also connected to a second reset loop comprising an odd number of reset delay inverters (I212) connected in series. The last reset delay inverter (I212) is connected to node RESET2 (209). The number of reset delay inverters (I212) is sufficient to cause a delay of longer than the duration of the transient. Experimental modeling has shown that seven reset delay inverters (I212) are typically sufficient. When node UPC2 (205) switches high, the reset loop switches node RESET2 (209) from high to low. The node RESET2 (209) is connected to the control gate of a pulse down reset transistor (T214), which is a PFET connected to internal power at its source and connected to node PULSE DOWN (203) at its drain. When node RESET2 (209) switches to low, the pulse down reset transistor (T214) switches node PULSE DOWN (203) back to its original state of high.

Node RESET2 (209) is also connected to a UPC2 reset inverter (I216), which is in turn connected to the control gate of a UPC2 reset transistor (T218). The UPC2 reset transistor (T218) is an NFET connected to ground at its source and connected to node UPC2 (205) at its drain. When node RESET2 (209) switches to low, the UPC2 reset transistor (T218) switches node UPC2 (205) back to its original state of low.

A third optional isolating resistive device (R220) can be connected between ground and node RESET2 (209) to prevent accidental switching due to coupling to external signals or system noise. Likewise, a fourth optional isolating resistive device (R222) can be connected between internal power and node PULSE DOWN (203). The isolating resistive devices (R220, R222) can be resistors or resistively connected FETs.

The purpose of the adjustable length transmission line (52) is to reduce transient voltages by providing a matching impedance for the reactive component of the complex impedance (z6) to the driver circuit (20). When the adjustable length transmission line (52) is short circuited at one end, the input impedance at the other end will have no resistive component. The reactive component (i.e., capacitive, inductive, or both) of the input impedance will have a magnitude dependent on the length (D52) of the adjustable length transmission line (52) and the frequency (f) of the signal from the driver circuit (20).

Thus, with a reactive impedance that can be automatically adjusted, impedance matching between the on-chip driver circuit (20) and the off-chip receiver circuit (10) can be achieved for a wide range of configurations. Frequency (f) is dependant upon system design, where performance demands increasingly require operation at ultra-high frequencies (1 GHz to 10 GHz and above). The required length (D52) of the adjustable length transmission line (52) can be calculated using electromagnetic principles as described by W. Hayt, Jr., *Engineering Electromagnetics*, Chapter 12 (McGraw-Hill, 1981), incorporated by reference.

Referring again to FIG. 2A, the resistive component (R1) and reactive component (X1) of the input impedance (Z1) on the receiver side of the transmission line (40) are given by Equations 1 and 2, respectively, in terms of frequency (f), receiver resistance (R10), receiver capacitance (C10), and receiver inductance (L31). As is known in the art, the impedance can be expressed in the form of Equation 0.

Equations 1 and 2 can be derived for an inductor (L31) in series with a parallel capacitor (C10) and resistor (R10), as shown in FIG. 2A, with $\omega = 2\pi f$.

$$Z = R + j \cdot X \quad \text{(eq. 0)}$$

$$Z1 = R1 + j \cdot X1 \quad \text{(eq. 0)}$$

$$R1 = \frac{R10}{1 + (\omega \cdot R10 \cdot C10)^2} \quad \text{(eq. 1)}$$

$$X1 = \frac{\omega \cdot L31 - (\omega \cdot R10^2 \cdot C10) + (\omega^3 \cdot R10^2 \cdot L31 \cdot C10^2)}{1 + (\omega \cdot R10 \cdot C10)^2} \quad \text{(eq. 2)}$$

From Engineering Elecromagnetics, the input impedance (Z4) at the driver side of the transmission line (40) can be expressed in terms of the characteristic impedance (Z40), the load impedance (Z1), the transmission line length (D40), and a phase factor (β40) for the transmission line (40).

$$Z4 = Z40 \cdot \frac{Z1 + [j \cdot Z40 \cdot \tan(\beta 40 \cdot D40)]}{Z40 + [j \cdot Z1 \cdot \tan(\beta 40 \cdot D40)]} \quad \text{(eq. 3)}$$

The phase factor (β40) is dependent upon the frequency (f) of the signal from the driver circuit (20) and the dielectric constant (ε40) and the relative permeability (μ40) for the transmission line (40), and can be determined using equations 4A and 4B, where c is the speed of light ($3 \times 10^8$ m/s).

$$\beta 40 = \frac{2\pi f}{v_{40}} \quad \text{(eq. 4A)}$$

$$v_{40} = \frac{c}{(\mu_{40} \cdot \varepsilon_{40})^{-0.5}} \quad \text{(eq. 4B)}$$

The resistive component (R4) and the reactive component (X4) of the input impedance (Z4) on the driver side of the transmission line (40) can be determined by substituting Equation 0 into Equation 3 and separating the real (resistive) and imaginary (reactive) components. The resistive component (R4) of the input impedance (Z4) at the driver side of the transmission line (40) can be expressed as Equation 5, and the reactive component (X4) of the input impedance (Z4) at driver side of the transmission line (40) can be expressed as Equation 6.

$$R4 = (R1 \cdot Z40^2) \cdot \frac{1 + \tan^2(\beta_{40} \cdot D_{40})}{[Z40 - (X1 \cdot \tan(\beta_{40} \cdot D_{40}))]^2 + [R1 \cdot \tan(\beta_{40} \cdot D_{40})]^2} \quad \text{(eq. 5)}$$

$$X4 = Z40 \cdot \frac{\{[X1 + (Z40\tan(\beta_{40} \cdot D_{40})] \cdot [Z40 - X1 \cdot \tan(\beta_{40} \cdot D_{40})]\} - [R1^2 \cdot \tan(\beta_{40} \cdot D_{40})]}{[Z40 - (X1 \cdot \tan(\beta_{40} \cdot D_{40}))]^2 + [R1 \cdot \tan(\beta_{40} \cdot D_{40})]^2} \quad \text{(eq. 6)}$$

The input impedance (Z6) at the driver side of the driver inductance (L32) can be expressed as Equation 7 for an inductor (32) in series with an impedance (Z4). As shown in FIG. 2A, this is the total impedance to the receiver side of the on-chip matching network.

$$Z6 = R4 + j \cdot (X4 + \omega \cdot L32) \quad \text{(eq. 7)}$$

The input impedance (Z6) at the driver side of the driver inductance (L32) can also be expressed as Equation 0.

$$Z6 = R6 + j \cdot X6 \quad \text{(eq. 0)}$$

Combining Equation 7 and Equation 0, the resistive and reactive components of the impedance at the receiver side of the matching network can be expressed as Equations 8 and 9, respectively.

$$R6 = R4 \quad \text{(eq. 8)}$$

$$X6 = X4 + \omega \cdot L32 \quad \text{(eq. 9)}$$

Figure 4:
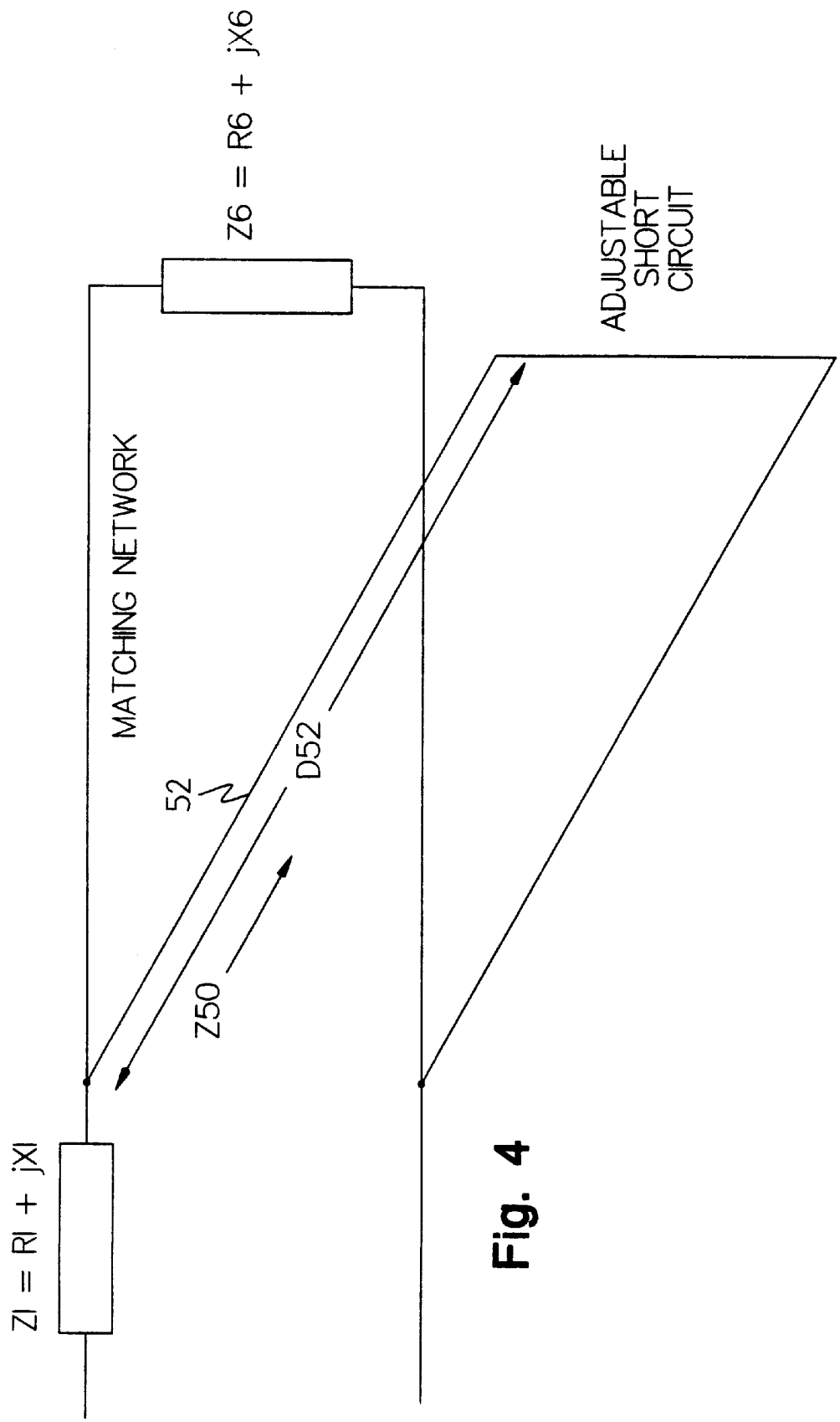
FIG. 4 illustrates an alternate circuit model showing the impedance matching network as an adjustable length transmission line, according to the present invention.

The driver circuit (20), on-chip matching network (50), transmission line (40), and receiver circuit (10) of FIG. 2A can now be reduced to the circuit shown in FIG. 4, where the impedance of the matching network (Z50) and the input impedance on the receiver side of the matching network (Z6) are in parallel.

The equivalent impedance (Z50) of the matching network (50) has no resistive component because the adjustable transmission line (52) is short circuited. The equivalent impedance of the matching network (50), as given by Equation 10, can be expressed as a function of the characteristic impedance (Z52) of the adjustable length transmission line (52), the phase factor (ε52) of the adjustable length transmission line (52), and the length (D52) to which the adjustable length transmission line (52) is set.

$$Z50 = j \cdot Z52 \cdot \tan(\varepsilon 52 \cdot D52) \quad \text{(eq. 10)}$$

The phase factor (β52) for the adjustable length transmission line (52) is dependent upon the frequency (f) of the signal from the driver circuit (20) and the dielectric constant ($\epsilon$52) and the relative permeability ($\mu$52) for the adjustable length transmission line (52). The phase factor ($\beta$52) for the adjustable length transmission line (52) can be determined using equations 11A and 11B, where c is the speed of light ($3\times10^8$ m/s).

$$\beta 52 = \frac{2\pi f}{v_{52}} \quad \text{(eq. 11A)}$$

$$v_{52} = \frac{c}{(\mu_{52} \cdot \varepsilon_{52})^{-0.5}} \quad \text{(eq. 11B)}$$

Figure 5:
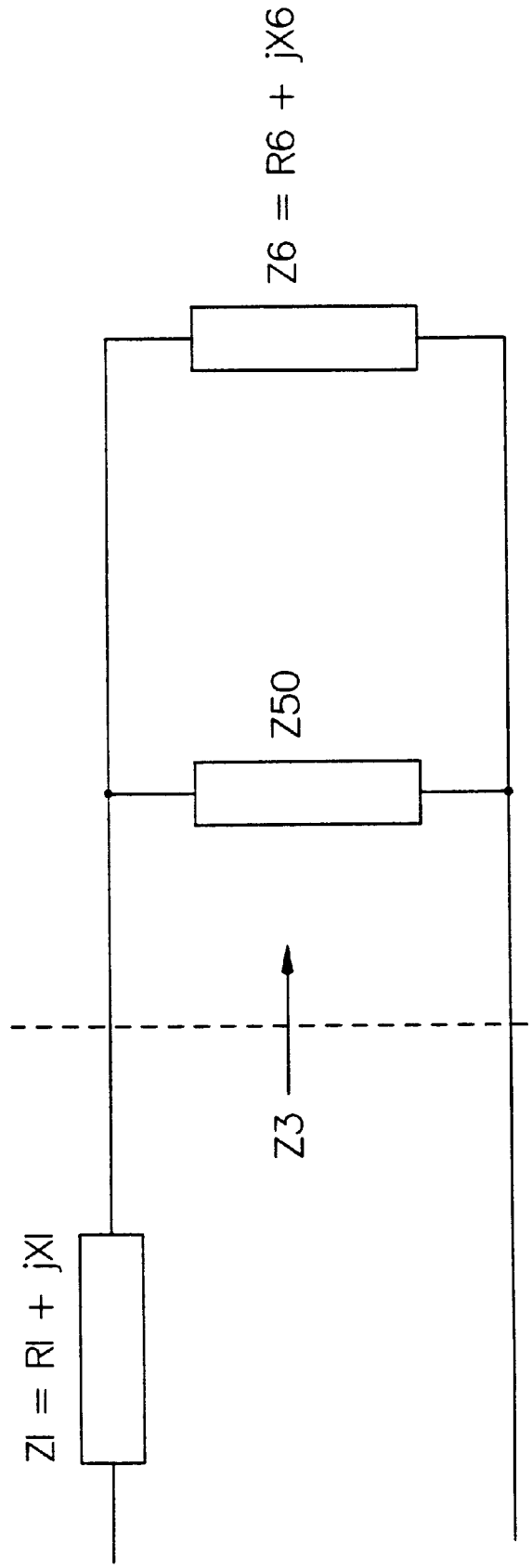
FIG. 5 illustrates a circuit model showing a composite impedance as derived for the receiver side of the matching network.

Referring to FIG. 5, the net input impedance (Z3) at the driver side of the matching network (50) is given by Equation 12. The resistive component (R3) of the net input impedance (Z3) is given by Equation 13. The reactive component (X3) of the net input impedance (Z3) is given by Equation 14.

$$Z3 = \frac{[j \cdot Z52 \cdot \tan(\beta 52 \cdot D52)](R6 + j \cdot X6)}{R6 + j \cdot X6 + [j \cdot Z52 \cdot \tan(\beta 52 \cdot D52)]} \quad \text{(eq. 12)}$$

$$R3 = \frac{[X6 + Z52 \cdot \tan(\beta 52 \cdot D52)][R6 + Z52 \cdot \tan(\beta 52 \cdot D52)] - [X6 \cdot R6 \cdot Z52 \cdot \tan(\beta 52 \cdot D52)]}{R6^2 + [X6 + Z52 \cdot \tan(\beta 52 \cdot D52)]^2} \quad \text{(eq. 13)}$$

$$X3 = \frac{[X6 \cdot Z52 \cdot \tan(\beta 52 \cdot D52)][X6 + Z52 \cdot \tan(\beta 52 \cdot D52)] + [R6^2 \cdot Z52 \cdot \tan(\beta 52 \cdot D52)]}{R6^2 + [X6 + Z52 \cdot \tan(\beta 52 \cdot D52)]^2} \quad \text{(eq. 14)}$$

The equivalent impedance (ZI) for the driver circuit (20) can be derived from the circuit model of FIG. 2A, and is given by Equation 15. The resistive component (RI) of the input impedance (ZI) to the driver side of the matching network (50) is given by Equation 16, and the reactive component (XI) of the input impedance (ZI) to the driver side of the matching network (50) is given by Equation 17. Equations 16 and 17 can be derived for a parallel capacitor (C20) and resistor (R20), as shown in FIG. 2A.

$$ZI = \frac{R20 \cdot (1/j \cdot \omega \cdot C20)}{R20 + (1/j \cdot \omega \cdot C20)} \quad \text{(eq. 15)}$$

$$RI = \frac{R20}{1 + (\omega \cdot R20 \cdot C20)^2} \quad \text{(eq. 16)}$$

$$XI = \frac{-(\omega \cdot R20^2 \cdot C20)}{1 + (\omega \cdot R20 \cdot C20)^2} \quad \text{(eq. 17)}$$

Referring again to FIG. 5, for impedance matching, the reactive components of the net input impedance (Z3) at the driver side of the matching network (50) and of the equivalent impedance (ZI) for the driver circuit (20) must cancel out (i.e., the matching network must provide a reactance, which in combination with the driver-receiver circuit, will give no net reactance). To do this, the reactive component X3 must be the conjugate (equal in magnitude with the opposite sign) of the reactive component XI, as shown in Equation 18. The matching of the reactive components will result in no overshoots or undershoots.

$$XI = -X3 \quad \text{(eq. 18)}$$

Figure 7:
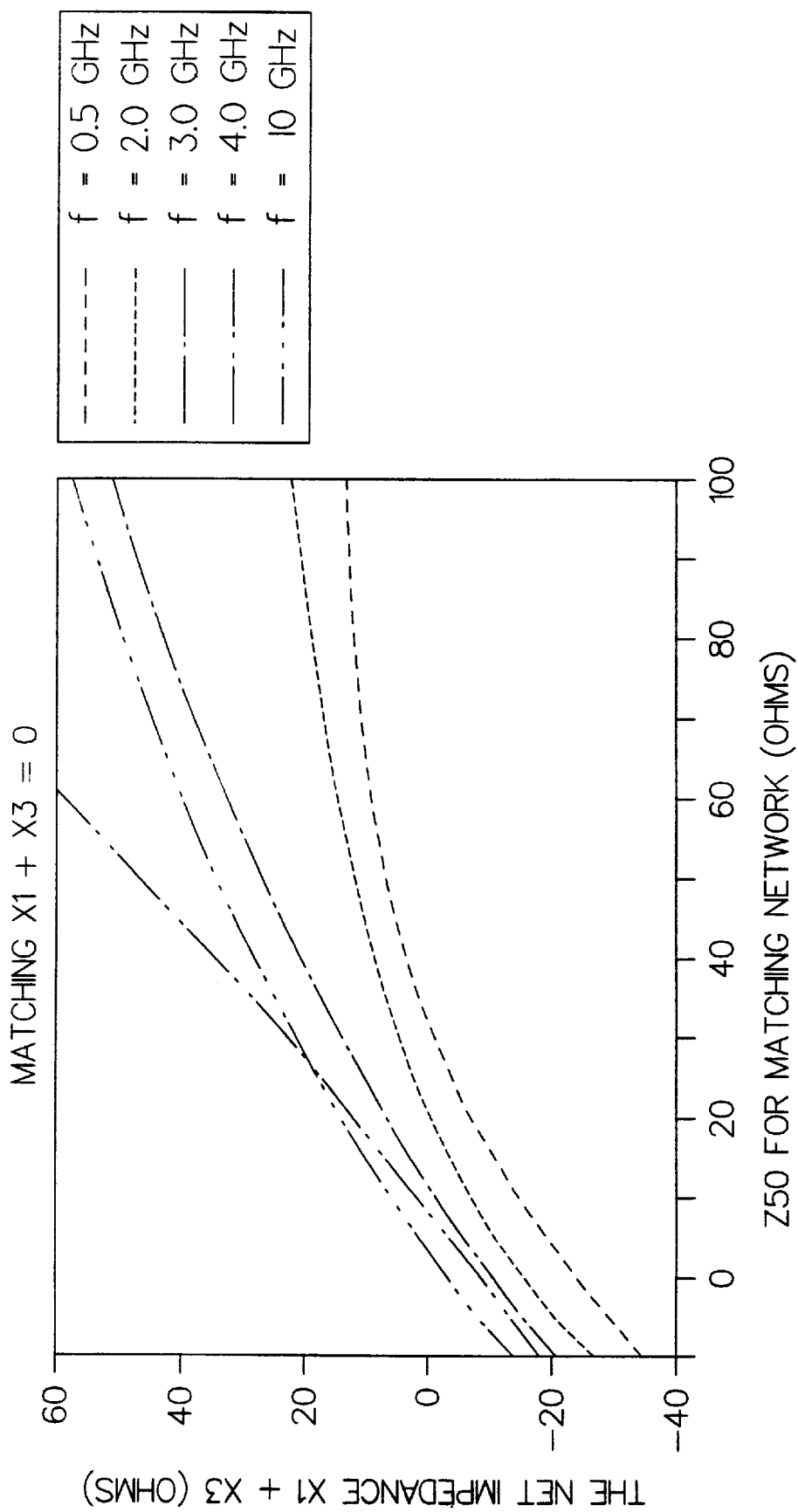
FIG. 7 shows net reactance (XI+X3) as a function of the impedance of an impedance matching network (50) according to the present invention.

Equations 14 and 17 can be substituted into Equation 18. Selected values for frequency (f) and length (D52) of the adjustable length transmission line (52) can be used to iteratively determine curves for the Net Reactance (XI+X3) as a function of the impedance (Z50) of the matching network (50). These curves are shown in FIG. 7 using typical values as previously provided for R10, C10, L31, D40, Z40, $\mu$40, $\epsilon$40, L32, R20, C20, Z52, $\mu$52, and $\epsilon$52. The point at which each frequency curve intersects the line for zero net reactance (XI+X3=0) provides the impedance (Z50) for the matching network (50) for impedance matching at that frequency. The lengths (D52) of the adjustable length transmission line (52) that provide impedance matching at selected frequencies (f) are presented in Table 1.

TABLE 1

Length of transmission line (D52) for termination resistance (R10) = 50 ohms

| f (GHz) | 0.5 | 2 | 3 | 4 | 10 |
|---|---|---|---|---|---|
| D52 (mm) | 18 | 4.3 | 1.7 | 0.9 | 0.2 |

The results indicate that, for high frequencies (above 1 GHz), the length (D52) of the adjustable length transmission line (52) needed for impedance matching is a few millimeters or less. For sufficiently high frequencies, the adjustable length transmission line (52) can be built on a chip and a microengine can be used to adjust the length (D52) of the adjustable length transmission line (52).

Figure 8:
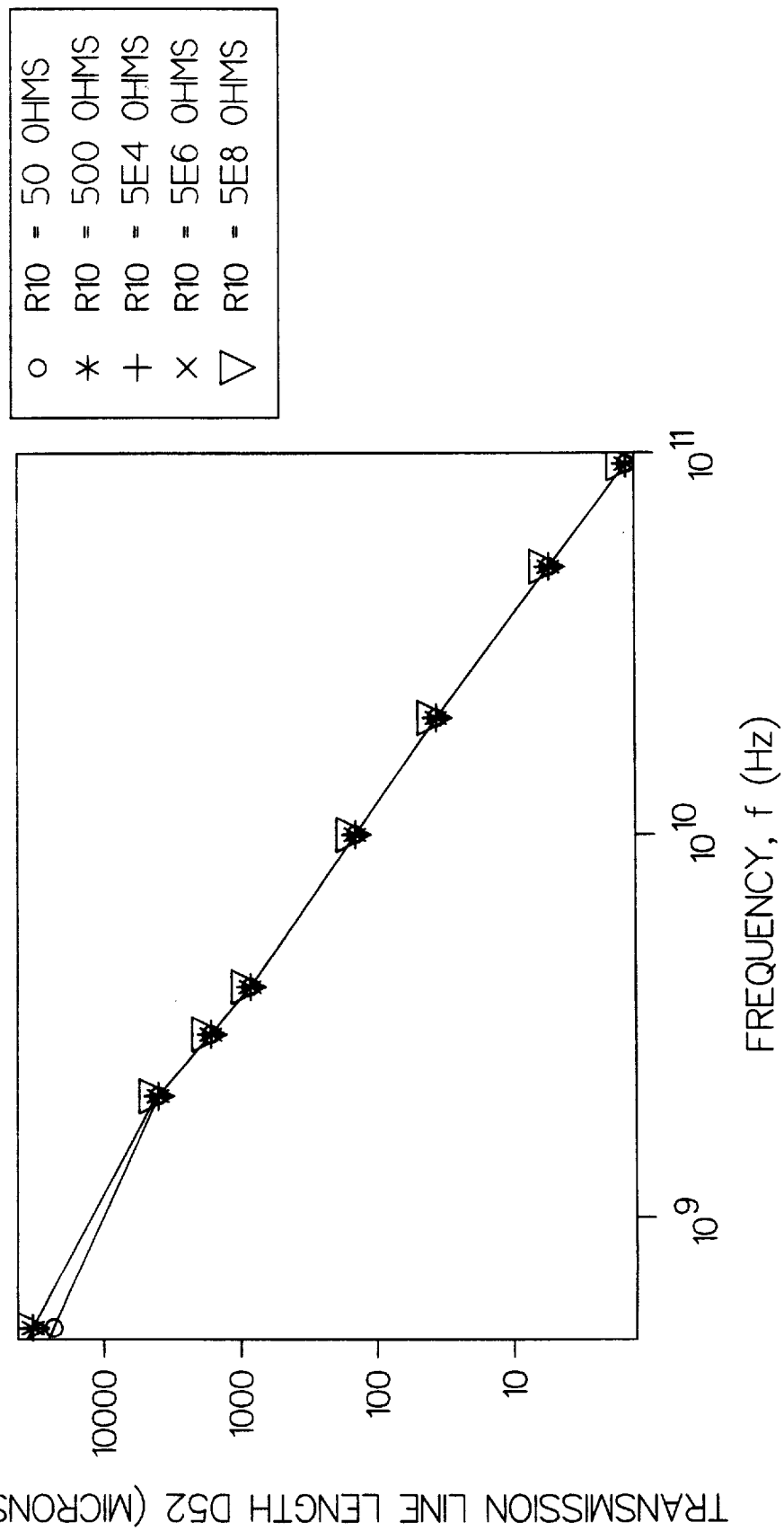
FIG. 8 shows the length of the adjustable length transmission line needed for impedance matching as a function of frequency for a receiver resistance (termination) in the range between 50 ohms and $5 \times 10^8$ ohms.

Additional iterative solutions were plotted for the length (D52) of the adjustable length transmission line (52) as a function of frequency over a range of values for R10, L31, L32, C10, C20, $\epsilon$40, D40, and Z40, successively. FIG. 8 shows that the invention can provide impedance matching using a comparable length (D52) adjustable length transmission line (52) for a receiver resistance (R10) in the range between 50 ohms and $5\times10^8$ ohms.

Figure 9:
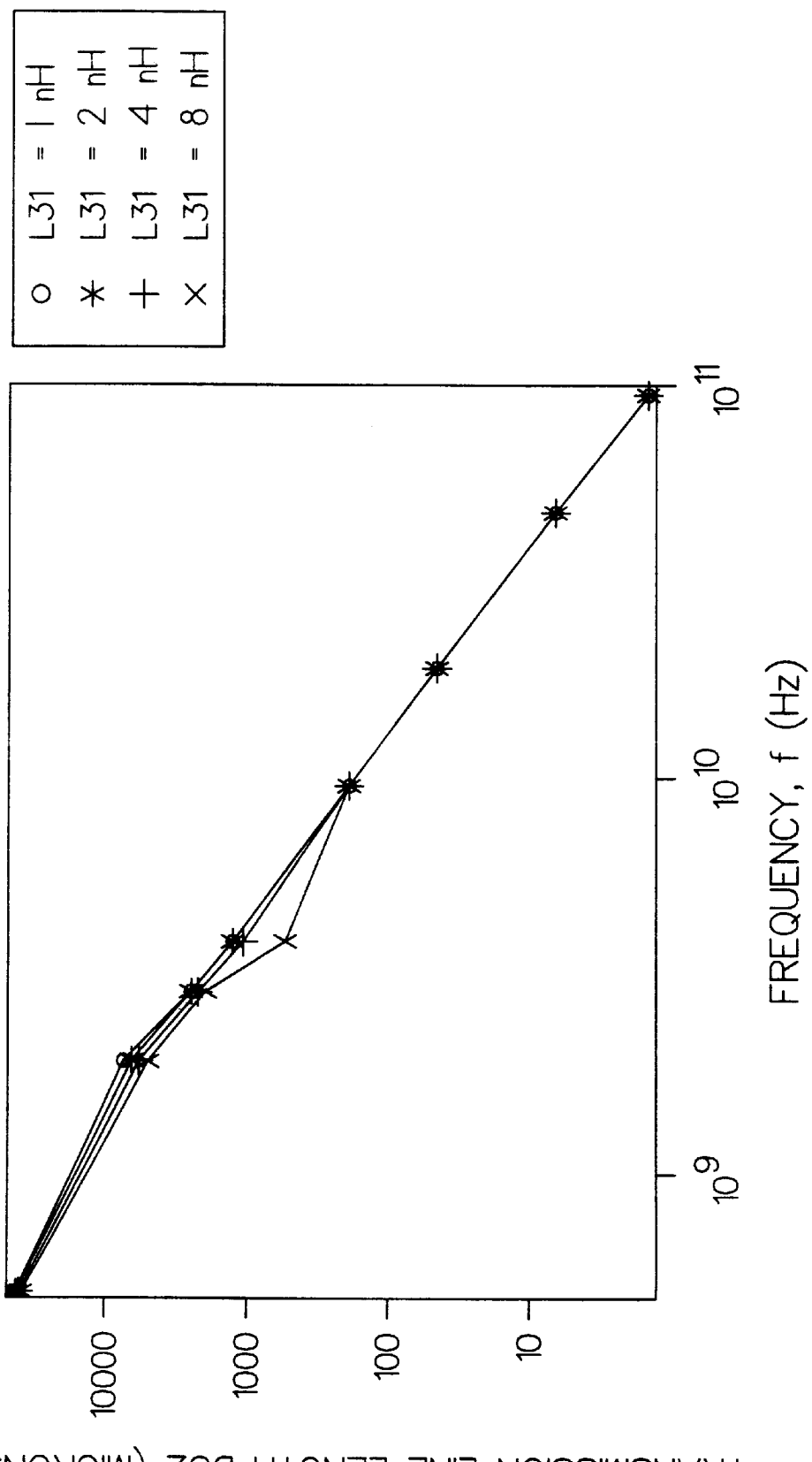
FIG. 9 shows the length of the adjustable length transmission line needed for impedance matching as a function of frequency for a receiver inductance in the range between 1 nH and 8 nH.
Figure 10:
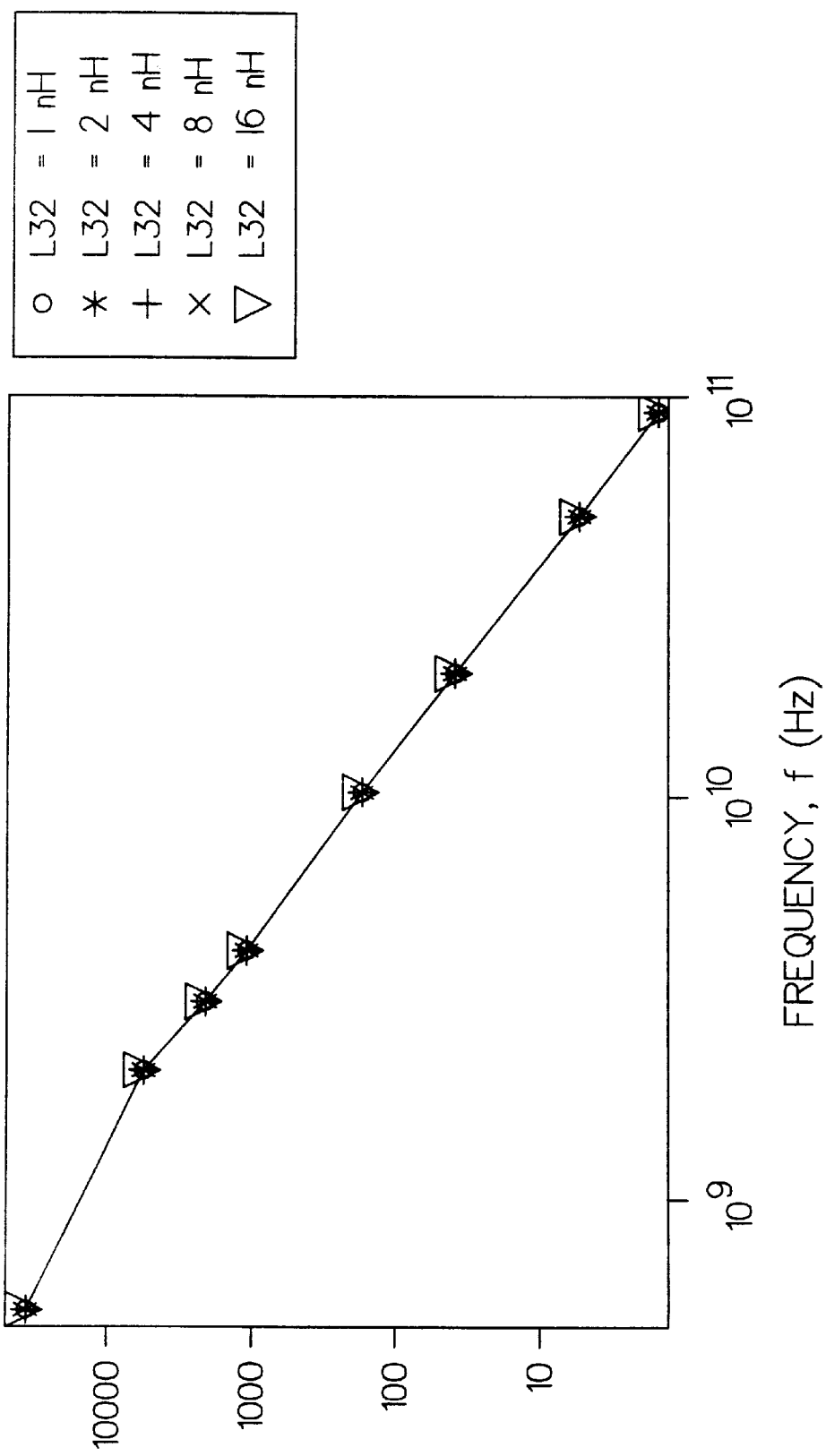
FIG. 10 shows the length of the adjustable length transmission line needed for impedance matching as a function of frequency for a driver inductance in the range between 1 nH and 16 nH.
Figure 11:
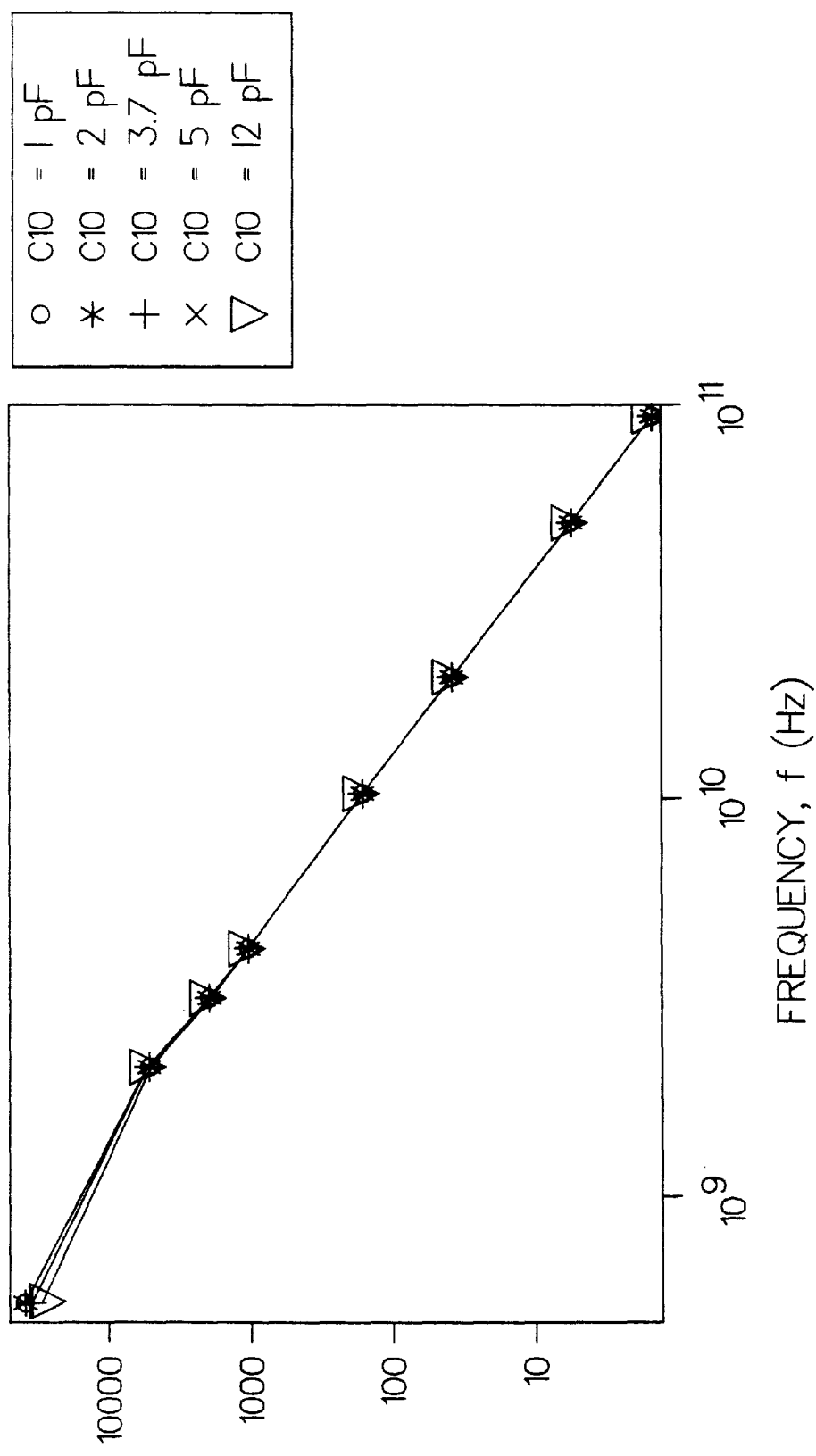
FIG. 11 shows the length of the adjustable length transmission line needed for impedance matching as a function of frequency for a receiver capacitance in the range between 1 pF and 12 pF.
Figure 12:
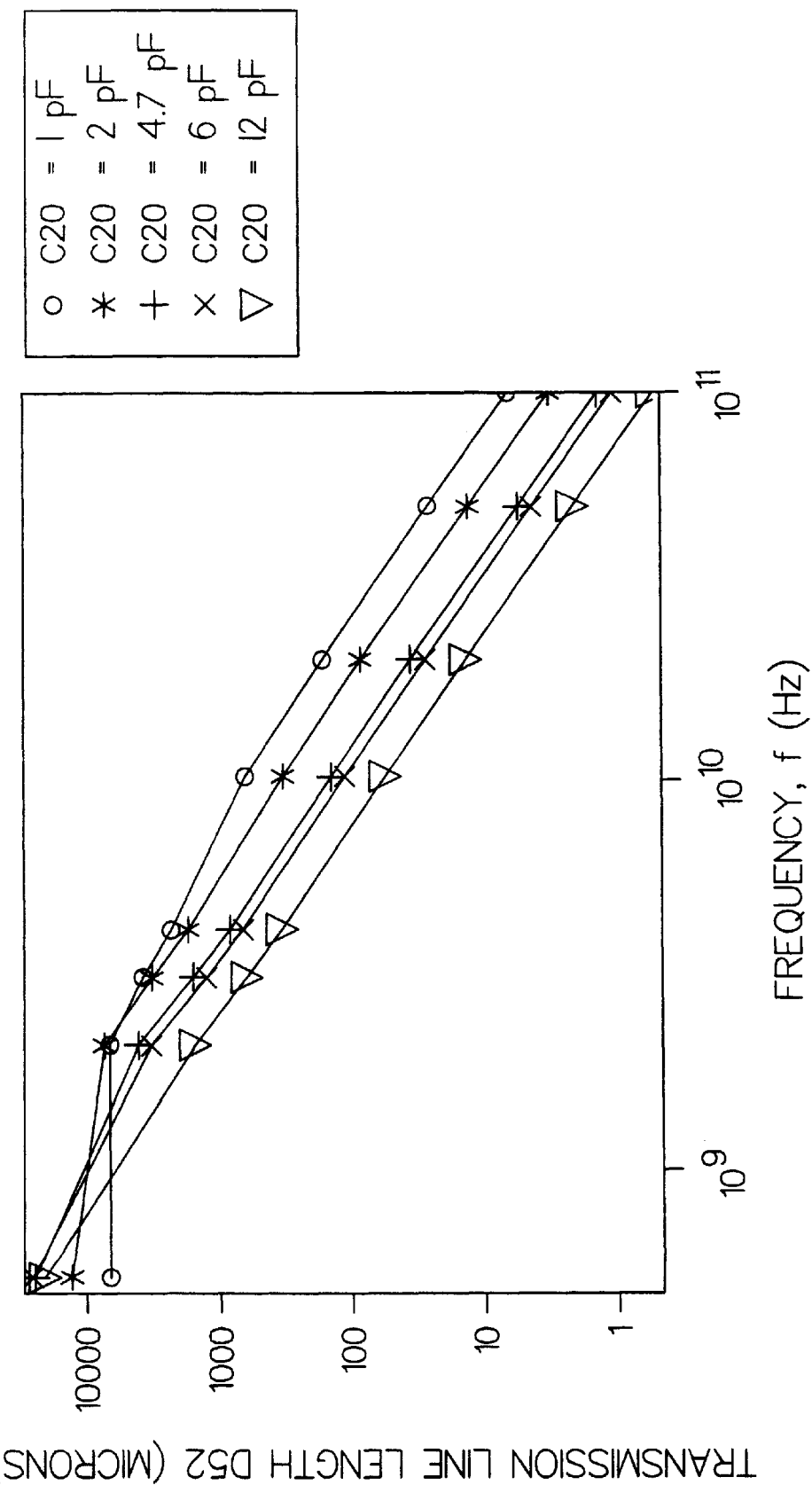
FIG. 12 shows the length of the adjustable length transmission line needed for impedance matching as a function of frequency for a driver capacitance in the range between 1 pF and 12 pF.

FIG. 9 shows that the invention can provide impedance matching using a comparable length (D52) adjustable length transmission line (52) for a receiver inductance (L31) in the range between 1 nH and 8 nH. FIG. 10 shows that the invention can provide impedance matching using a comparable length (D52) adjustable length transmission line (52) for a driver inductance (L32) in the range between 1 nH and 16 nH. FIG. 11 shows that the invention can provide impedance matching using a comparable length (D52) adjustable length transmission line (52) for a receiver capacitance (C10) in the range between 1 pF and 12 pF. FIG. 12 shows that the invention can provide impedance matching using a comparable length (D52) adjustable length transmission line (52) for a driver capacitance (C20) in the range between 1 pF and 12 pF.

Figure 13:
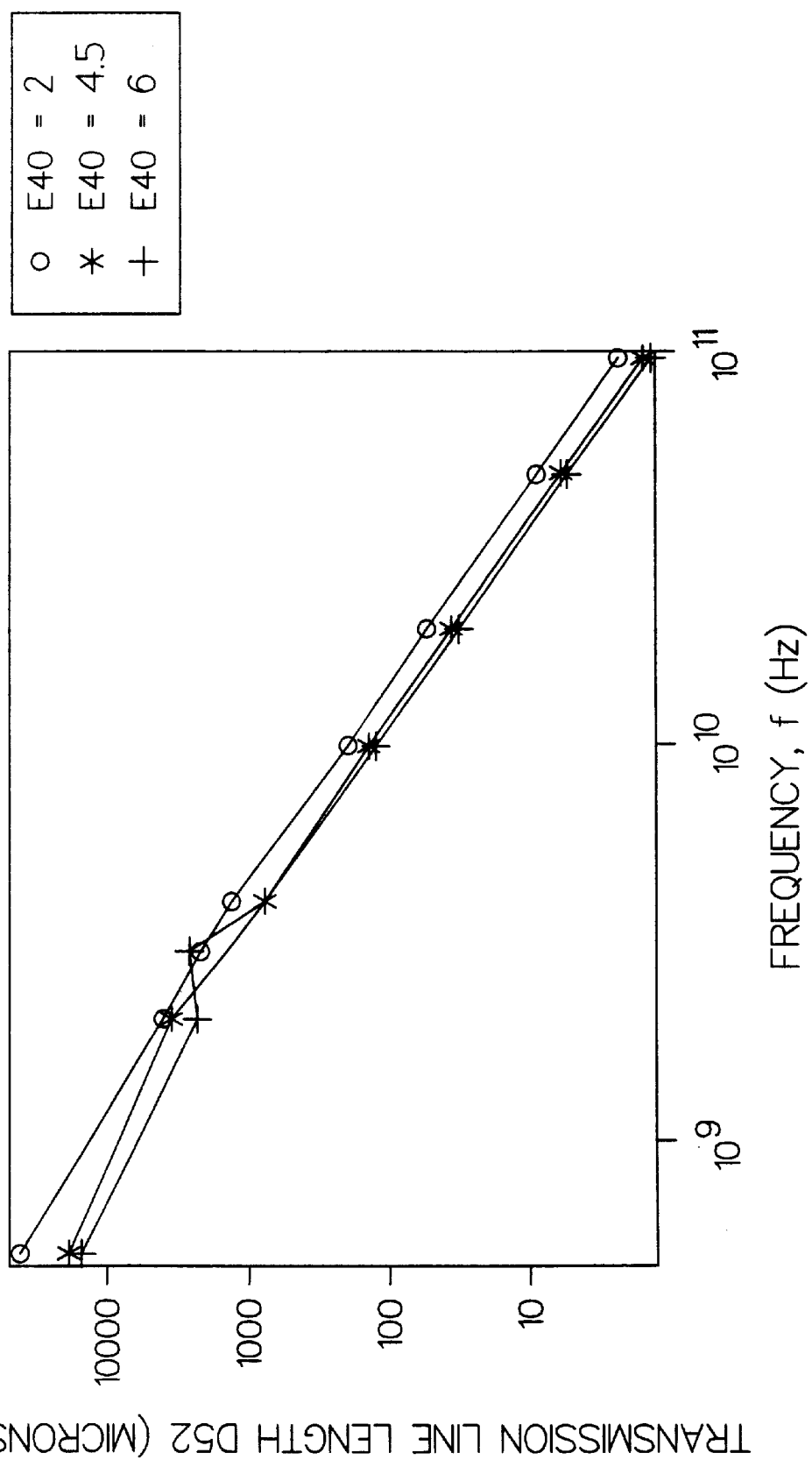
FIG. 13 shows the length of the adjustable length transmission line needed for impedance matching as a function of frequency for a dielectric constant for the transmission line in the range between 2 and 6.
Figure 14:
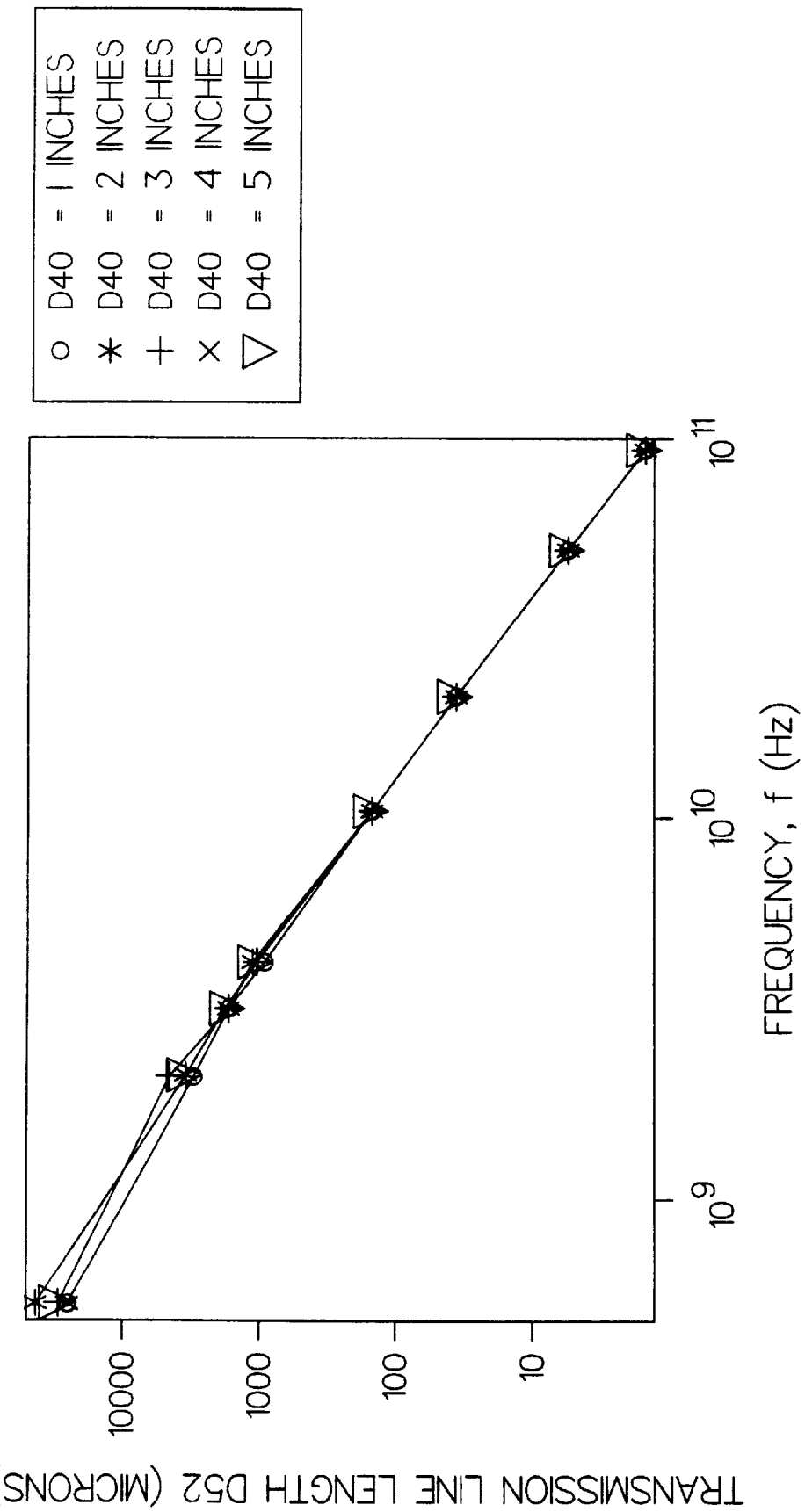
FIG. 14 shows the length of the adjustable length transmission line needed for impedance matching as a function of frequency for a length of the transmission line in the range between 25.4 mm (1 inch) and 127 mm (5 inches)
Figure 15:
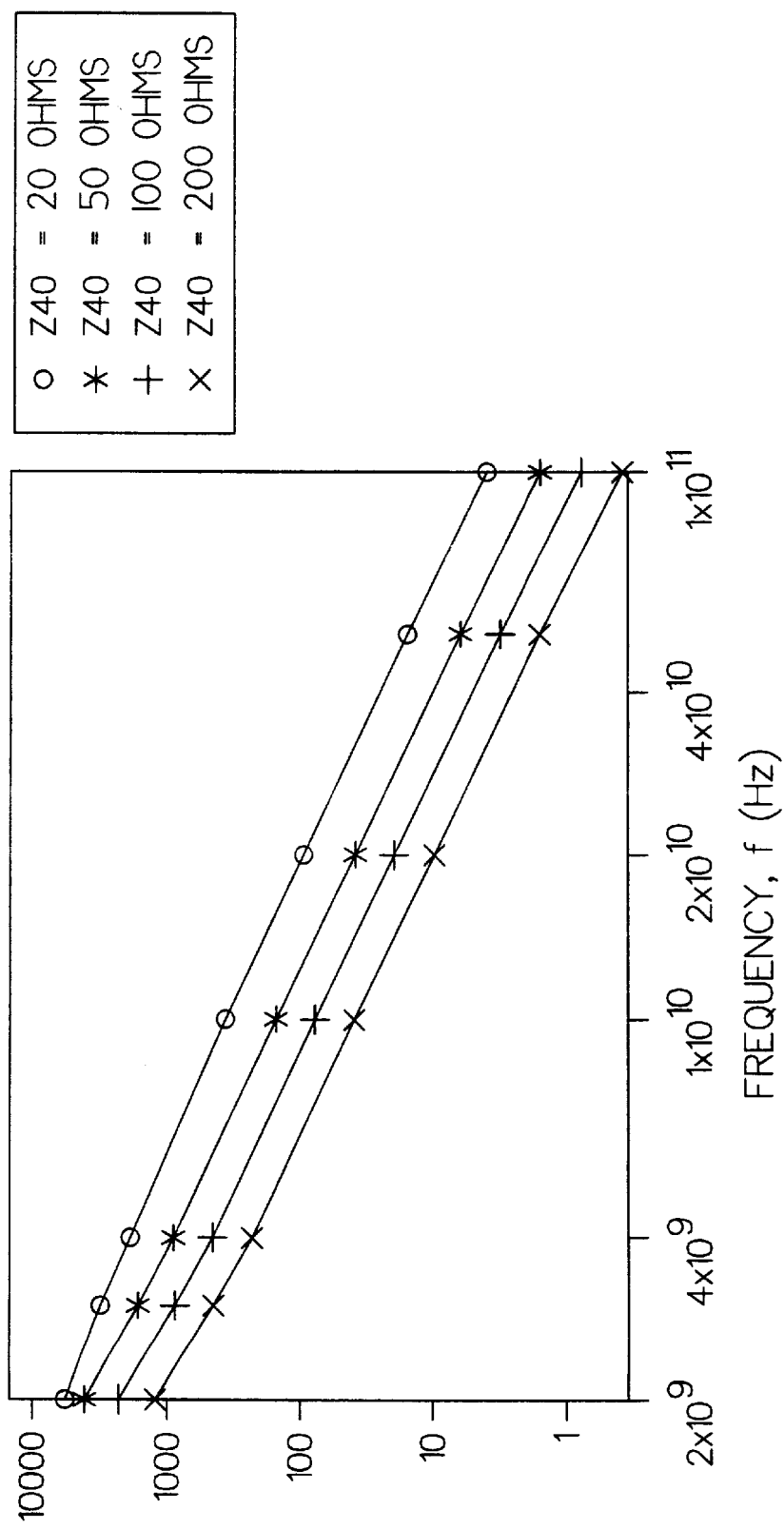
FIG. 15 shows the length of the adjustable length transmission line needed for impedance matching as a function of frequency for a characteristic impedance of the transmission line in the range between 20 ohms and 200 ohms.

FIG. 13 shows that the invention can provide impedance matching using a comparable length (D52) adjustable length transmission line (52) for a dielectric constant ($\epsilon$40) for the transmission line (40) in the range between 2 and 6. FIG. 14 shows that the invention can provide impedance matching using a comparable length (D52) adjustable length transmission line (52) for a length (D40) of the transmission line (40) in the range between 25.4 mm (1 inch) and 127 mm (5 inches). FIG. 15 shows that the invention can provide impedance matching using a comparable length (D52) adjustable length transmission line (52) for a characteristic impedance (Z40) of the transmission line (40) in the range between 20 ohms and 200 ohms.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed:

1. An impedance matching network for a semiconductor chip with an input-output driver circuit located on said chip, said impedance matching network comprising:

an adjustable length transmission line located on said chip and connected in parallel with said input-output driver circuit;

a control circuit located on said chip and generating a control voltage varied in response to high and low transient voltages on the driver circuit output; and adjustment means located on said chip for adjusting the length of said adjustable length transmission line proportionally to said control voltage generated by said on-chip control circuit.

2. The impedance matching network of claim 1 wherein said adjustment means is a microengine.

3. The impedance matching network of claim 1 wherein said adjustable length transmission line comprises two parallel conductive lines shorted by a movable stub.

4. The impedance matching network of claim 1 further comprising a positive detect circuitry and a negative detect circuitry and wherein said control circuit comprises a quantity of "n" N-type field effect transistors (NFETs) connected in parallel between internal power and a CONTROL VOLTAGE node, said NFETs having control gates connected to an n-bit counter which is incrementally increased by said positive detect circuitry when an overshoot occurs on said driver circuit output and by said negative detect circuitry when an undershoot occurs on said driver circuit output.

5. An automatic impedance matching system, comprising:

a semiconductor chip;

a driver circuit located on said chip and having a driver capacitance;

an impedance matching network located on said chip and having an adjustable length transmission line connected in parallel with said driver circuit;

a receiver circuit having a receiver resistance and a receiver capacitance; and a transmission line located off-chip from said driver circuit and connected at one end through driver chip connections to said driver circuit and connected on the opposite end through receiver connections to said receiver circuit, said transmission line having a length, a characteristic impedance, and a dielectric constant, said driver chip connections having a driver inductance, and said receiver connections having a receiver inductance.

6. The impedance matching system of claim 5 wherein the receiver resistance is in the range between 50 ohms and $5 \times 10^8$ ohms.

7. The impedance matching system of claim 5 wherein the receiver inductance is in the range between 1 nH and 8 nH.

8. The impedance matching system of claim 5 wherein the driver inductance is in the range between 1 nH and 16 nH.

9. The impedance matching system of claim 5 wherein the receiver capacitance is in the range between 1 pF and 12 pF.

10. The impedance matching system of claim 5 wherein the driver capacitance is in the range between 1 pF and 12 pF.

11. The impedance matching system of claim 5 wherein the dielectric constant of the transmission line is in the range between 2 and 6.

12. The impedance matching system of claim 5 wherein the length of the transmission line is in the range between 25 mm and 127 mm.

13. The impedance matching system of claim 5 wherein the impedance of the transmission line is in the range between 20 ohms and 200 ohms.

14. A process for reducing overshoots and undershoots on a driver circuit output by impedance matching, comprising the steps of:

detecting overshoots on said driver circuit output using a positive detect circuitry and transmitting an incremental pulse to a counter;

detecting undershoots on said driver circuit using a negative detect circuitry and transmitting an incremental pulse to the counter;

transmitting an activation voltage to the control gates of a quantity of N-type field effect transistors, wherein the quantity of N-type field effect transistors so activated is proportional to the count of the counter and the N-type field effect transistors are connected in parallel between internal power and a CONTROL VOLTAGE node;

transmitting a control voltage from the CONTROL VOLTAGE node to an adjustment means, wherein the control voltage is proportional to the quantity of the N-type field effect transistors that are activated; and moving a movable stub which is connected across two parallel conductive lines a distance proportional to the magnitude of the control voltage, the parallel conductive lines being connected in parallel to the driver circuit at one end thereby forming an adjustable length transmission line comprising the parallel conductive lines and the movable stub, whereby the adjustable length transmission line is adjusted to a length at which the impedances at the driver circuit are matched and overshoots and undershoots are reduced.

15. An automatic impedance matching network located on a semiconductor chip having a driver circuit with an output, the automatic impedance matching network comprising:

an adjustable length transmission line having a length, comprised of parallel conductive lines connected in parallel with the driver circuit at one end, electrically isolated at the opposite end, and shorted by a movable stub intermediate of the ends;

a control circuit detecting high voltage transients and low voltage transients on said driver circuit output and providing a control voltage incrementally varied in response to said high and low voltage transients on said driver circuit output; and adjustment means adapted to receive said control voltage from said control circuit, said adjustment means transferring a linear motion to said movable stub, said linear motion proportional in magnitude to said control voltage, thereby adjusting said length of said adjustable length transmission line to cause impedance matching at said driver circuit.

* * * * *